(12) United States Patent
Chen

(10) Patent No.: US 6,923,945 B2
(45) Date of Patent: Aug. 2, 2005

(54) LAYERED $SO_x$ TOLERANT $NO_x$ TRAP CATALYSTS AND METHODS OF MAKING AND USING THE SAME

(75) Inventor: Shau-Lin F. Chen, Piscataway, NJ (US)

(73) Assignee: Engelhard Corporation, Iselin, NJ (US)

(*) Notice: Subject to any disclaimer, the term of this patent is extended or adjusted under 35 U.S.C. 154(b) by 4 days.

(21) Appl. No.: 10/766,374

(22) Filed: Jan. 28, 2004

(65) Prior Publication Data

US 2004/0198595 A1 Oct. 7, 2004

Related U.S. Application Data

(62) Division of application No. 09/834,505, filed on Apr. 13, 2001, now Pat. No. 6,777,370.

(51) Int. Cl.[7] .......................... B01D 53/50; B01D 53/56; B01D 53/60
(52) U.S. Cl. ................ 423/239.1; 423/244.02
(58) Field of Search .......................... 423/239.1, 244.02

(56) References Cited

U.S. PATENT DOCUMENTS

| | | | |
|---|---|---|---|
| 5,248,650 A | 9/1993 | Sekiba et al. | 502/303 |
| 5,472,673 A | 12/1995 | Goto et al. | 422/169 |
| 5,597,771 A | 1/1997 | Hu et al. | 502/304 |
| 5,687,565 A | 11/1997 | Modica et al. | 60/274 |
| 5,792,436 A | 8/1998 | Feeley et al. | 423/210 |
| 5,874,057 A | 2/1999 | Deeba et al. | 423/239.1 |
| 5,884,473 A | 3/1999 | Noda et al. | 60/274 |

FOREIGN PATENT DOCUMENTS

| | | | | |
|---|---|---|---|---|
| EP | 0 707 882 A1 | 4/1996 | | B01D/53/94 |
| EP | 1 046 423 A2 | 10/2000 | | B01J/23/63 |

*Primary Examiner*—Wayne A. Langel
(74) *Attorney, Agent, or Firm*—Richard A. Negin

(57) ABSTRACT

The present invention relates to a layered catalyst composite useful for reducing contaminants in exhaust gas streams, especially gaseous streams containing sulfur oxide contaminants. More specifically, the present invention is concerned with improved catalysts of the type generally referred to as "three-way conversion" catalysts. The layered catalysts trap sulfur oxide contaminants which tend to poison three-way conversion catalysts used to abate other pollutants in the stream. The layered catalyst composites of the present invention have a sulfur oxide absorbing layer before or above a nitrogen oxide absorbing layer. The layered catalyst composite comprises a first layer and a second layer. The first layer comprises a first support and at least one first platinum component. The second layer comprises a second support and a $SO_x$ sorbent component having a free energy of formation from about 0 to about −90 Kcal/mole at 350° C. The sulfur oxide absorbing layer selectively and reversibly absorbs sulfur oxides over nitrogen oxides and prevents or alleviates sulfur oxide poisoning of the nitrogen oxide trap.

16 Claims, 2 Drawing Sheets

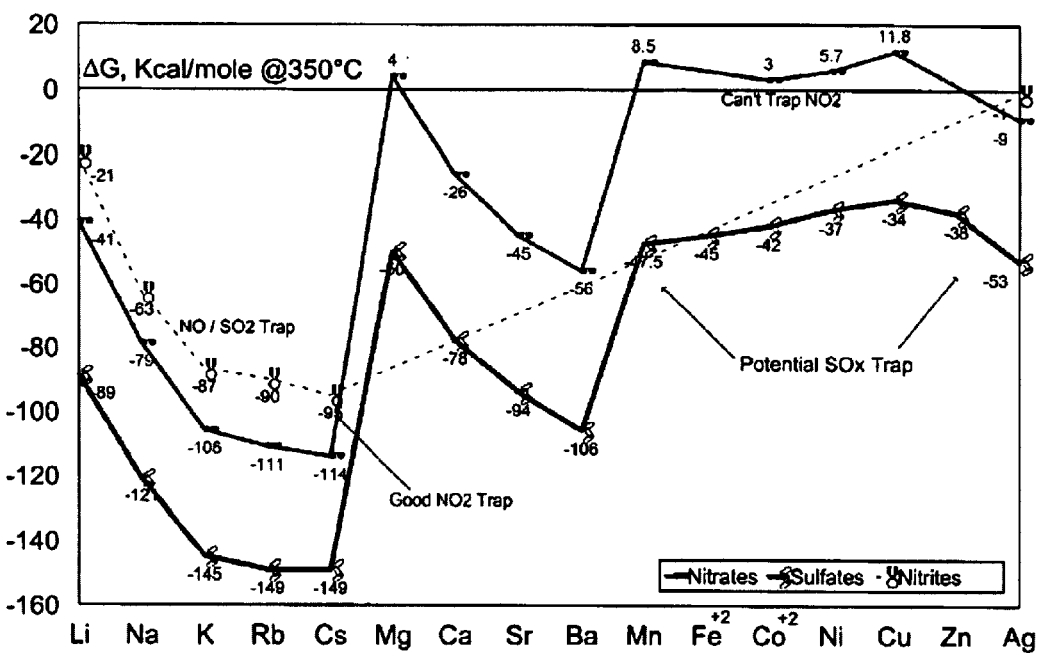
Fig. 1: Free Energies of Formation of Nitrates, Sulfates, & Nitrites

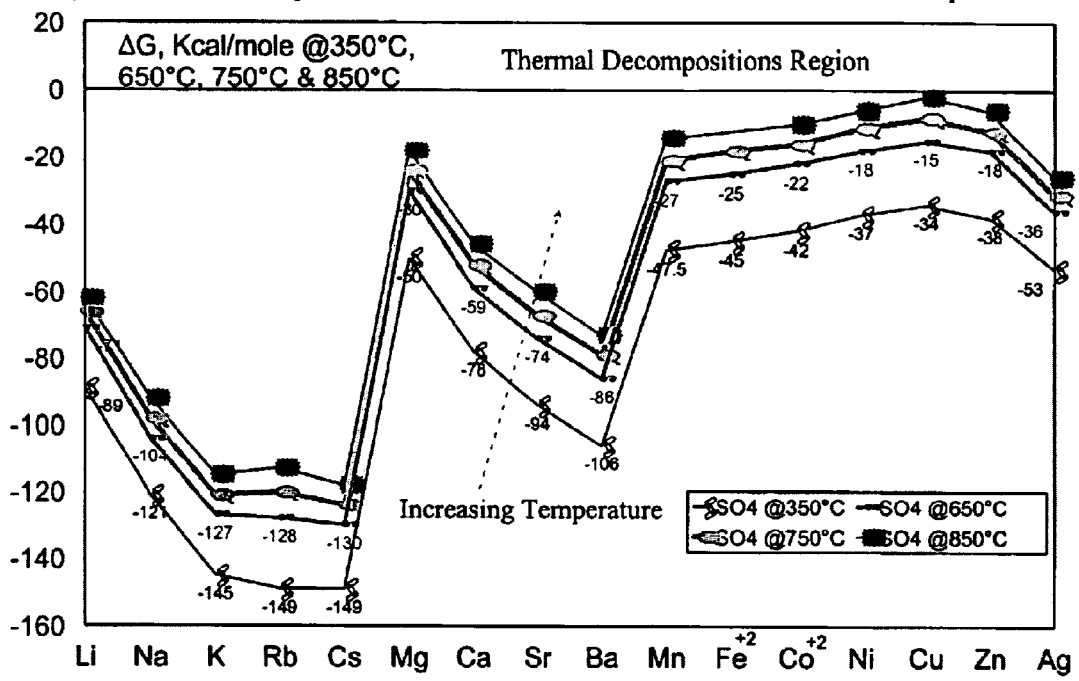

LAYERED SO$_x$ TOLERANT NO$_x$ TRAP CATALYSTS AND METHODS OF MAKING AND USING THE SAME

This is a divisional of application Ser. No. 09/834,505, filed 13 Apr. 2001 now U.S. Pat. No. 6,777,370.

BACKGROUND OF THE INVENTION

1. Field of the Invention

The present invention relates to a layered catalyst composite useful for reducing contaminants in exhaust gas streams, especially gaseous streams containing sulfur oxide contaminants. More specifically, the present invention is concerned with improved catalysts of the type generally referred to as "three-way conversion" catalysts. The layered catalysts trap sulfur oxide contaminants which tend to poison three-way conversion catalysts used to abate other pollutants in the stream. The layered catalyst composites of the present invention have a sulfur oxide absorbing layer before or above a nitrogen oxide absorbing layer. The sulfur oxide absorbing layer selectively and reversibly absorbs sulfur oxides over nitrogen oxides and alleviates sulfur oxide poisoning of the nitrogen oxide trap.

2. Related Art

Three-way conversion catalysts ("TWC") have utility in a number of fields including the abatement of nitrogen oxides ("NO$_x$"), carbon monoxide ("CO"), and hydrocarbon ("HC") pollutants from internal combustion engines, such as automobile and other gasoline-fueled engines. Three-way conversion catalysts are polyfunctional because they have the ability to substantially simultaneously catalyze the oxidation of hydrocarbons and carbon monoxide and the reduction of nitrogen oxides. Emissions standards for nitrogen oxides, carbon monoxide, and unburned hydrocarbon contaminants have been set by various government agencies and must be met by new automobiles. In order to meet such standards, catalytic converters containing a TWC catalyst are located in the exhaust gas line of internal combustion engines. The catalysts promote the oxidation by oxygen in the exhaust gas of the unburned hydrocarbons and carbon monoxide and the reduction of nitrogen oxides to nitrogen. For example, it is known to treat the exhaust of engines with a catalyst/NO$_x$ sorbent which stores NO$_x$ during periods of lean (oxygen-rich) operation, and releases the stored NO$_x$ during the rich (relatively fuel-rich) periods of operation. During periods of rich operation, the catalyst component of the catalyst/NO$_x$ sorbent promotes the reduction of NO$_x$ to nitrogen by reaction of NO$_x$ (including NO$_x$ released from the NO$_x$ sorbent) with HC, CO, and/or hydrogen present in the exhaust.

TWC catalysts exhibiting good activity and long life comprise one or more platinum group metals, e.g., platinum, palladium, rhodium, ruthenium, and iridium. These catalysts are employed with a high surface area, refractory oxide support such as a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The supported catalyst is generally used with a NO$_x$ storage (sorbent) component including alkaline earth metal oxides, such as oxides of Ca, Sr and Ba, alkali metal oxides such as oxides of K, Na, Li and Cs, and rare earth metal oxides such as oxides of Ce, La, Pr and Nd, see U.S. Pat. No. 5,473,887.

Sulfur oxide ("SO$_x$") contaminants present in an exhaust gaseous stream tend to poison and thereby inactivate TWC catalysts. SO$_X$ is a particular problem because it is generated by the oxidation of sulfur compound impurities often found in gasoline and diesel fuel. TWC catalysts employing NO$_X$ storage components tend to suffer from loss of long-term activity because of SO$_x$ poisoning of the NO$_x$ traps. NO$_x$ trap components also trap SO$_x$ and form very stable sulfates which require extreme conditions and a high fuel penalty to regenerate the trapping capacity of the NO$_x$ storage component. A guard or filter (e.g., alumina) may be placed before the TWC catalyst to protect the catalyst from SO$_x$ but these guards or filters often become saturated with So$_X$. Without valves, these guards require artificial engine cycles to desorb SOx by creating extended rich A/F period at elevated temperature. However, the SOx released under these conditions normally caused high H2S emission with unpleasant odor and to some extent poison the downstream NOx absorber.

High surface refractory metal oxides are often employed as a support for many of the catalytic components. For example, high surface area alumina materials, also referred to as "gamma alumina" or "activated alumina" typically exhibit a BET (Brunauer, Emmett, and Teller) surface area in excess of 60 square meters per gram ("m$^2$/g"), and often up to about 200 m$^2$/g or more. Such activated alumina is usually a mixture of the gamma and delta phases of alumina, but may also contain substantial amounts of eta, kappa and theta alumina phases. Refractory metal oxides other than activated alumina may be utilized as a support for at least some of the catalytic components in a given catalyst. For example, bulk ceria, zirconia, alpha alumina and other materials are known for such use. Although many of these materials have a lower BET surface area than activated alumina, that disadvantage tends to be offset by the greater durability of the resulting catalyst.

Exhaust gas temperatures can reach 1000° C. in a moving vehicle and such elevated temperatures can cause activated alumina, or other support material, to undergo thermal degradation with accompanying volume shrinkage especially in the presence of steam. During this degradation, the catalytic metal becomes occluded in the shrunken support medium with a loss of exposed catalyst surface area and a corresponding decrease in catalytic activity. U.S. Pat. No. 4,171,288 discloses a method to stabilize alumina supports against such thermal degradation by the use of materials such as zirconia, titania, alkaline earth metal oxides such as baria, calcia, or strontia, or rare earth metal oxides such as ceria, lanthana, and mixtures of two or more rare earth metal oxides.

U.S. Pat. Nos. 4,714,694, 4.727,052, and 4,708,946 disclose the use of bulk cerium oxide (ceria) to provide a refractory oxide support for platinum group metals other than rhodium. Highly dispersed, small crystallites of platinum on the ceria particles may be formed and stabilized by impregnation with a solution of an aluminum compound followed by calcination.

U.S. Pat. No. 3,993,572 discloses catalysts for promoting selective oxidation and reduction reactions. The catalyst contains platinum group metal, rare earth metal (ceria) and alumina components which may be supported on a relatively inert carrier such as a honeycomb.

U.S. Pat. No. 4,714,694 discloses a method of making a material which includes impregnating bulk ceria or a bulk ceria precursor with an aluminum compound and calcining the impregnated ceria to provide an aluminum stabilized ceria.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,367,162 discloses a three-way catalyst system which comprises a carrier having a substructure of refractory material in the form of a honeycomb structure and a porous layer of a powder formed on the surface thereof selected from the group consisting of a powder of zirconium oxide and a mixed powder of zirconium oxide powder with at least powder selected from the group consisting of alumina, alumina-magnesia spinel and cerium oxide, and a catalyst ingredient supported thereon consisting of cerium oxide and a metal selected from the group consisting of platinum, palladium, and mixtures thereof.

U.S. Pat. No. 4,438,219 discloses an alumina catalyst, stable at high temperatures, for use on a substrate. The stabilizing material is derived from barium, silicon, rare earth metals, alkali and alkaline earth metals, boron, thorium, hafnium, and zirconium. Barium oxide, silicon dioxide, and rare earth oxides including lanthanum, cerium, praseodymium, and neodymium are preferred. Contacting the stabilizing material with a calcined alumina film permits the calcined alumina film to retain a high surface area at higher temperatures.

U.S. Pat. Nos. 4,476,246, 4,591,578 and 4,591,580 disclose three-way catalyst compositions comprising alumina, ceria, an alkali metal oxide promoter, and Noble metals. U.S. Pat. Nos. 3,993,572 and 4,157,316 describe attempts to improve the catalyst efficiency of Pt/Rh based TWC systems by incorporating a variety of metal oxides, e.g., rare earth metal oxides such as ceria and base metal oxides such as nickel oxides. U.S. Pat. No. 4,591,518 discloses a catalyst comprising an alumina support with catalytic components consisting essentially of a lanthana component, ceria, an alkali metal oxide, and a platinum group metal. U.S. Pat. No. 4,591,580 discloses an alumina supported platinum group metal catalyst modified to include support stabilization by lanthana or lanthana rich rare earth oxides, double promotion by ceria and alkali metal oxides and optionally nickel oxide.

U.S. Pat. No. 4,624,940 discloses palladium containing catalyst compositions useful for high temperature applications. The combination of lanthanum and barium is found to provide a superior hydrothermal stabilization of alumina which supports the catalytic component, palladium. Thus, the palladium metal expulsion from the alumina due to phase transformation to encounter drastic sintering upon high temperature exposure is avoided. The use of particulate bulk metal oxide enhances catalytic activities. The bulk metal oxide consists of primarily ceria containing and/or ceria-zirconia containing particles. These particulate bulk metal oxides do not readily react with the stabilized alumina particles, thus, provide the catalytically promoting effect.

U.S. Pat. No. 4,780,447 discloses a catalyst capable of controlling HC, CO and $NO_x$ as well as $H_2S$ in emissions from the tailpipe of catalytic converter equipped automobiles. The use of nickel oxides and/or iron oxides is known as a $H_2S$ gettering of compound.

U.S. Pat. No. 4,294,726 discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500° C. to 700° C. in air after which the material is impregnated with an aqueous solution of a salt of platinum and a salt of rhodium dried and subsequently treated in a hydrogen-containing gas at a temperature of 250° C.–650° C. The alumina may be thermally stabilized with calcium, strontium, magnesium or barium compounds. The ceria-zirconia-iron oxide treatment is followed by impregnating the treated carrier material with aqueous salts of platinum and rhodium and then calcining the impregnated material.

U.S. Pat. No. 4,965,243 discloses a method to improve the thermal stability of a TWC catalyst containing precious metals by incorporating a barium compound and a zirconium compound together with ceria and alumina to form a catalytic moiety to enhance stability of the alumina washcoat upon exposure to high temperature.

J01210032 and AU-615721 disclose a catalytic composition comprising palladium, rhodium, active alumina, a cerium compound, a strontium compound and a zirconium compound. These patents suggests the utility of alkaline earth metals in combination with ceria, zirconia to form a thermally stable alumina supported palladium containing washcoat.

U.S. Pat. No. 4,504,598 discloses a process for producing a high temperature resistant TWC catalyst. The process includes forming an aqueous slurry of particles of gamma or activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

U.S. Pat. Nos. 3,787,560, 3,676,370, 3,552,913, 3,545,917, 3,524,721 and 3,899,444 disclose the use of neodymium oxide for use in reducing nitric oxide in exhaust gases of internal combustion engines. U.S. Pat. No. 3,899,444 in particular discloses that rare earth metals of the lanthanide series are useful with alumina to form an activated stabilized catalyst support when calcined at elevated temperatures. Such rare earth metals are disclosed to include lanthanum, ceria, cerium, praseodymium, neodymium and others.

U.S. Pat. No. 5,792,436 discloses a method for removing nitrogen oxides, sulfur oxides, and phosphorus oxides from a lean gaseous stream. The method comprises (a) passing the gaseous stream through a catalyzed trap comprising a regenerable sorbent material and an oxidation catalyst and sorbing the sorbable components into the sorbent material, (b) introducing a combustible component into the gaseous stream upstream of the catalyzed trap member and combusting the combustible component in the presence of the oxidation catalyst to thermally desorb the sorbable component from the sorbent material, and (c) passing the sorbable component-depleted stream to a catalytic treatment zone for the abatement of the pollutants and by-passing the sorbable component-enriched stream around the catalytic treatment zone.

TWC catalyst systems comprising a carrier and two or more layers of refractory oxide are disclosed. Japanese Patent Publication No. 145381/1975 discloses a catalyst-supported structure for purifying exhaust gases comprising a thermally insulating ceramic carrier and at least two layers of catalyst containing alumina or zirconia, the catalysts containing alumina or zirconia layers being different from each other.

Japanese Patent Publication No. 105240/1982 discloses a catalyst for purifying exhaust gases containing at least two carrier layers of a refractory metal oxide, each containing a different platinum-group metal. A layer of a refractory metal oxide free from the platinum-group metal is positioned between the carrier layers and/or on the outside of these carrier layers.

Japanese Patent Publication No. 52530/1984 discloses a catalyst having a first porous carrier layer composed of an inorganic substrate and a heat-resistant Noble metal-type catalyst deposited on the surface of the substrate and a second heat-resistant non-porous granular carrier layer having deposited thereon a Noble metal-type catalyst. The second carrier layer is formed on the surface of the first carrier layer and has resistance to the catalyst poison.

Japanese Patent Publication No. 127649/1984 discloses a catalyst for purifying exhaust gases comprising an inorganic carrier substrate such as cordierite, an alumina layer formed on the surface of the substrate and having deposited thereon a rare earth metal, such as lanthanum and cerium, and platinum or palladium, and a second layer formed on the first alumina-based layer and having deposited thereon a base metal such as iron or nickel and a rare earth metal such as lanthanum or rhodium.

Japanese Patent Publication No. 19036/1985 discloses a catalyst for purifying exhaust gases having an enhanced ability to remove carbon monoxide at low temperatures. The catalyst comprises a substrate composed of cordierite and two layers of active alumina laminated to the surface of the substrate. The lower alumina layer contains platinum or vanadium deposited thereon, and the upper alumina layer contains rhodium and platinum, or rhodium and palladium, deposited thereon.

Japanese Patent Publication No. 31828/1985 discloses a catalyst for purifying exhaust gases comprising a honeycomb carrier and a Noble metal having a catalytic action for purifying exhaust gases. The carrier is covered with an inside and an outside alumina layer, the inside layer having more Noble metal adsorbed thereon than the outside layer.

Japanese Patent Publication No. 232253/1985 discloses a monolithic catalyst for purifying exhaust gases in the shape of a pillar and comprising a number of cells disposed from an exhaust gas inlet side toward an exhaust gas outlet side. An alumina layer is formed on the inner wall surface of each of the cells and catalyst ingredients are deposited on the alumina layer. The alumina layer consists of a first alumina layer on the inside and a second alumina layer on the surface side, the first alumina layer having palladium and neodymium, and the second alumina layer having platinum and rhodium.

Japanese Kokai 71538/87 discloses a catalyst layer supported on a catalyst carrier and containing one catalyst component selected from the group consisting of platinum, palladium and rhodium. An alumina coat layer is provided on the catalyst layer. The coat layer contains one oxide selected from the group consisting of cerium oxide, nickel oxide, molybdenum oxide, iron oxide and at least one oxide of lanthanum and neodymium (1–10% by wt.).

U.S. Pat. Nos. 3,956,188 and 4,021,185 disclose a catalyst composition having (a) a catalytically active, calcined composite of alumina, a rare earth metal oxide and a metal oxide selected from the group consisting of an oxide of chromium, tungsten, a group IVB metal and mixtures thereof and (b) a catalytically effective amount of a platinum group metal added thereto after calcination of the composite. The rare earth metals include cerium, lanthanum and neodymium.

U.S. Pat. No. 4,806,519, discloses a two layer catalyst structure having alumina, ceria and platinum on the inner layer and aluminum, zirconium and rhodium on the outer layer.

JP-88-240947 discloses a catalyst composite which includes an alumina layer containing ceria, ceria-doped alumina and at least one component selected from the group of platinum, palladium and rhodium. A second layer contains lanthanum-doped alumina, praseodymium-stabilized zirconium, and lanthanum oxide and at least one component selected from the group of palladium and rhodium. The two layers are placed on a catalyst carrier separately to form a catalyst for exhaust gas purification.

Japanese Patent J-63-205141-A discloses a layered automotive catalyst in which the bottom layer comprises platinum or platinum and rhodium dispersed on an alumina support containing rare earth oxides, and a top coat which comprises palladium and rhodium dispersed on a support comprising alumina, zirconia and rare earth oxides.

Japanese Patent J-63-077544-A discloses a layered automotive catalyst having a first layer comprising palladium dispersed on a support comprising alumina, lanthana and other rare earth oxides and a second coat comprising rhodium dispersed on a support comprising alumina, zirconia, lanthana and rare earth oxides.

Japanese Patent J-63-007895-A discloses an exhaust gas catalyst comprising two catalytic components. One component comprises platinum dispersed on a refractory inorganic oxide support and a second component comprises palladium and rhodium dispersed on a refractory inorganic oxide support.

U.S. Pat. No. 4,587,231 discloses a method of producing a monolithic three-way catalyst for the purification of exhaust gases. A mixed oxide coating is applied to a monolithic carrier by treating the carrier with a coating slip in which an active alumina powder containing cerium oxide is dispersed together with a ceria powder and then baking the treated carrier. Platinum, rhodium and/or palladium are then deposited on the oxide coating by a thermal decomposition. Optionally, a zirconia powder may be added to the coating slip.

U.S. Pat. No. 4,134,860 relates to catalyst compositions that can contain platinum group metals, base metals, rare earth metals and refractory supports. The composition can be deposited on a relatively inert carrier such as a honeycomb. U.S. Pat. No. 4,923,842 discloses a catalytic composition for treating exhaust gases comprising a first support having dispersed thereon at least one oxygen storage component and at least one Noble metal component, and having dispersed immediately thereon an overlayer comprising lanthanum oxide and optionally a second support. The layer of catalyst is separate from the lanthanum oxide. The Nobel metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

U.S. Pat. No. 5,057,483 discloses a catalyst composition disposed in two discrete coats on a carrier. The first coat includes a stabilized alumina support on which a first platinum catalytic component and bulk ceria is dispersed, a bulk iron oxide, a metal oxide such as bulk nickel oxide (which is effective for the suppression of hydrogen sulfide emissions), and one or both of baria and zirconia dispersed throughout the first coat as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support.

U.S. Pat. No. 5,472,673 discloses an exhaust gas purification device for an engine. The device comprises an engine, an exhaust passage, an NOx absorbent, and a sulphur trapping means. The exhaust passage extends from an upstream end which receives exhaust gas from the engine to a downstream end from which exhaust gas is released. The NOx absorbent is arranged in the exhaust passage wherein the NOx absorbent absorbs NOx contained in the exhaust gas when a concatenation of oxygen in the exhaust gas flowing into the NOx absorbent is above a predetermined oxygen concentration. The NOx absorbent releases the absorbed NOx when the concentration of oxygen in the exhaust gas flowing into the NOx absorbent is lower than the predetermined oxygen concentration. The sulphur trapping means is arranged in the exhaust passage upstream of the NOx absorbent for trapping SOx contained in the exhaust gas wherein the trapped SOx is not released from the sulphur trapping means when the concentration of oxygen in the exhaust gas flowing into the sulphur trapping means is lower than the predetermined oxygen concentration so that SOx is prevented from reaching and being absorbed into the NOx absorbent.

U.S. Pat. No. 5,687,565 discloses a method for reducing the concentration of carbon monoxide, organic compounds and sulfur oxides in an exhaust gas from an internal combustion engine. The method comprises (a) contacting the exhaust gas with a sulfur oxide absorbent in a first contacting zone and absorbing with the sulfur oxide absorbent at least a portion of the sulfur oxides in the exhaust gas wherein the sulfur oxide absorption is substantially irreversible at temperatures which are less than or equal to that of the exhaust gas; (b) contacting the effluent gas from the first contacting zone with a catalyst in a second contacting zone and catalyzing the conversion of at least a portion of the carbon monoxide and organic compounds in the effluent gas from the first contacting zone to innocuous products; and (c) transferring heat from the exhaust gas to the second contacting zone by indirect heat exchange.

U.S. Pat. No. 5,687,565 discloses a system for exhaust gas purification disposed in an exhaust pipe of an internal combustion engine. The system comprises a catalyst composition giving an excellent light-off performance at low temperatures which comprises a precious metal and a substance having at least one of an electron donatability and a nitrogen dioxide absorbability and releasability, and optionally an adsorbent having hydrocarbon adsorbability.

WO92/09848 discloses a combustion catalyst comprising palladium and optionally a Group 1B or VIII noble metal which may be placed on a support comprising zirconium. The combustion catalyst may be graded to have a higher activity portion at the leading edge of the catalyst structure. The invention includes a partial combustion process in which the fuel is partially combusted using that catalyst. The catalyst structure is stable in operation, has a comparatively low operating temperature, has a low "light off" temperature, and is not susceptible to temperature "runaway". The combustion gas produced by the catalytic process may be at a temperature below the autocombustive temperature, may be used at that temperature, or fed to other combustive stages for further use in a gas turbine, furnace, or boiler.

The conventional catalysts described above employing $NO_x$ storage components have the disadvantage under practical applications of suffering from long-term activity loss because of $SO_x$ poisoning of the $NO_x$ traps. The $NO_x$ trap components employed in the catalysts tend to trap $SO_x$ and form very stable sulfates which require extreme conditions and extract a high fuel penalty to regenerate the trapping capacity of the $NO_x$ storage component. Accordingly, it is a continuing goal to develop a three-way catalyst system which can reversibly trap $SO_x$ present in the gaseous stream and thereby prevent $SO_x$ sulfur oxide poisoning of the $NO_x$ trap.

SUMMARY OF THE INVENTION

The present invention relates to a thermally stable, layered catalyst composite of the type generally referred to as a three-way conversion catalyst (TWC). TWC catalysts are polyfunctional because they have the ability to substantially simultaneously catalyze the oxidation of hydrocarbons and carbon monoxide and the reduction of nitrogen oxides. The layered catalyst composites of the present invention have a sulfur oxide absorbing layer before or above a nitrogen oxide absorbing layer. The sulfur oxide absorbing layer selectively and reversibly absorbs sulfur oxides over nitrogen oxides and thereby alleviates sulfur oxide poisoning of the three-way conversion catalyst. Because $SO_x$ poisoning of the three-way conversion catalysts is minimized, the layered catalyst composites are able to maintain long term activity and effectively oxidize hydrocarbons and carbon monoxide and reduce nitrogen oxide compounds.

In a first embodiment, the structure of the layered catalyst composite of the present invention is designed in a radial arrangement wherein there is a first layer having a first layer composition and a second layer having a second layer composition. The first layer is also referred to as the bottom or inner layer and the second layer is referred to as the top or outer layer. Exhaust gaseous emissions comprising hydrocarbons, carbon monoxide, nitrogen oxides, and sulfur oxides initially encounter the second or top layer, and thereafter encounter the first or bottom layer. The top layer comprises a support and a $SO_x$ sorbent component having a free energy of formation from about 0 to about −90 Kcal/mole at 350° C. The bottom layer comprises a support and a platinum component to catalyze the oxidation of hydrocarbons and carbon monoxide and the reduction of nitrogen oxides. The bottom layer may optionally include a $NO_x$ sorbent component selected from the group consisting of alkaline earth metal components, alkali metal components, and rare earth metal components. Upon passing through the top layer, the exhaust gas becomes depleted in $SO_x$ and then contacts the bottom layer. In the bottom layer, the three-way conversion catalyst/$NO_x$ sorbent stores $NO_x$ during lean periods and releases and reduces stored $NO_x$ during rich periods.

In use, the exhaust gas stream, which is contacted with the layered catalyst composite of the present invention, is alternately adjusted between lean and stoichiometric/rich operating conditions so as to provide alternating lean operating periods and stoichiometric/rich operating periods. The exhaust gas stream being treated may be selectively rendered lean or stoichiometric/rich either by adjusting the air-to-fuel ratio fed to the engine generating the exhaust or by periodically injecting a reductant into the gas stream upstream of the catalyst. For example, the layered catalyst composite of the present invention is well suited to treat the exhaust of engines, including diesel engines, which continuously run lean. In such case, in order to establish a stoichiometric/rich operating period, a suitable reductant, such as fuel, may be periodically sprayed into the exhaust immediately upstream of the catalytic trap of the present invention to provide at least local (at the catalytic trap) stoichiometric/rich conditions at selected intervals. Partial lean-burn engines, such as partial lean-burn gasoline engines, are designed with controls which cause them to operate lean with brief, intermittent rich or stoichiometric conditions. In practice, the $SO_x$ sorbent components in the top layer selectively absorb in-coming $SO_X$ during a lean mode operation (200° C. to 600° C.) and desorb $SO_x$ (regenerate) during a rich mode operation (450° C. to 750° C.). When the exhaust gas temperature returns to a lean mode operation (200° C. to 600° C.), the regenerated $SO_x$ sorbent components in the top layer can again selectively absorb in-coming $SO_x$. The duration of the lean mode may be controlled so that the $SO_x$ trap in the top layer will not be saturated with $SO_x$. For example, a vehicle can run from 5 to 8 hours in a lean mode before a rich mode (60–100 mile/hour running at stoichiometric or L=0.98) is required. The lean duration of the run is inversely proportional to the sulfur content in the fuel. The rich mode is preferred to be carried out at high-speed fuel-enrichment stage where engine cooling by fuel is a common practice.

In a preferred embodiment, the first layer of the layered catalyst composite comprises a first support, a first platinum component, optionally a first platinum group metal component other than platinum, and optionally a $NO_x$ sorbent component selected from the group consisting of alkaline earth metal components, alkali metal components, and rare earth metal components. The optional first platinum group metal component other than platinum in the first layer may be selected from the group consisting of palladium, rhodium, ruthenium, and iridium components. The preferred first platinum group metal component other than platinum in the first layer is selected from the group consisting of palladium, rhodium, and mixtures thereof. Preferably, the $NO_x$ sorbent component is selected from the group consisting of oxides of calcium, strontium, and barium, oxides of potassium, sodium, lithium, and cesium, and oxides of cerium, lanthanum, praseodymium, and neodymium. The first layer may additionally comprise a first zirconium component. Preferably, the first layer comprises at least one first alkaline earth metal component and at least one first rare earth metal component selected from the group consisting of lanthanum metal components and neodymium metal components.

In this preferred embodiment, the second layer of the layered catalyst composite comprises a second support and a $SO_x$ sorbent component having a free energy of formation from about 0 to about −90 Kcal/mole at 350° C. The second layer may optionally comprise a second platinum component to facilitate $NO_X/SO_X$ oxidization and $NO_X/SO_X$ decomposition and reduction and optionally at least one second platinum group metal component other than platinum. The optional second platinum group metal component other than platinum in the second layer may be selected from the group consisting of palladium, rhodium, ruthenium, and iridium components. The preferred second platinum group metal component other than platinum in the second layer is selected from the group consisting of palladium, rhodium, and mixtures thereof. The second layer may additionally optionally comprise a second zirconium component. Preferably, the second layer comprises at least one second alkaline earth metal component and at least one second rare earth metal component selected from the group consisting of lanthanum metal components and neodymium metal components.

As set out above, the present invention employs a second or top layer of a $SO_x$ sorbent component which acts as a sulfur oxide absorbing layer to selectively and reversibly absorb sulfur oxides over nitrogen oxides and thereby provide a sulfur guard for the $NO_x$ trap component/three-way conversion catalyst. The $SO_x$ sorbent component in the $SO_x$ absorbing layer is a metal oxide which is less basic than the metal oxide in the $NO_x$ absorbing layer. The less basic $SO_X$ sorbent component forms $SO_x$ complexes (sulfates) that are less stable than the $SO_X$ complexes formed with the more basic $NO_X$ trap components. The $SO_x$ sorbent components of the present invention have a free energy of formation from about 0 to about −90 Kcal/mole at 350° C., preferably from about 0 to about −60 Kcal/mole at 350° C., and more preferably from about −30 to about −55 Kcal/mole at 350° C. The free energy of formation is the free-energy change for a reaction in which a substance in its standard state is formed from its elements in their standard states. The free energy of a system is the internal energy of a system minus the product of its temperature and its entropy, that is G=H−TS, where G is the Gibbs free energy, H is enthalpy, T is absolute temperature, and S is entropy. FIG. 1 shows the free energy of formation in Kcal/mole at 350° C. for a number of metal oxides reacting to form nitrates, sulfates, carbonates, nitrites, and sulfites. In general, metals having a free energy of formation with $NO_x$ greater than about 0 Kcal/mole at 350° C. (i.e., 10 Kcal/mole) will not readily adsorb $NO_x$ while metals having a free energy of formation with $SO_x$ lower than about −90 Kcal/mole at 350° C. (i.e., −100 Kcal/mole) will form very stable sulfate but not readily desorb $SO_x$.

FIG. 2 shows the free energy of formation in Kcal/mole at 350° C., 650° C., and 750° C. for a number of metal oxides reacting to form nitrates and sulfates.

The top layer comprises $SO_x$ absorbing components which will not substantially absorb $NO_x$ under the operating conditions, e.g., from about 300° C. to about 600° C. The medium temperature regeneration $SO_x$ traps selectively absorb $SO_x$ so that the $SO_x$ traps will not be saturated with nitrate salts in the lean mode and consequently lose their $SO_X$-trap capacity. The $SO_x$ sorbent component is capable of selectively absorbing $SO_x$ over $NO_x$ in a temperature range from about 100° C. to about 600° C. and capable of desorbing $SO_x$ in a temperature range from about 500° C. to about 700° C. Preferably, the SOx sorbent component is capable of selectively absorbing $SO_x$ over $NO_x$ in a temperature range from about 150° C. to about 475° C., more preferably in a temperature range from about 200° C. to about 450° C., and most preferably in a temperature range from about 250° C. to about 450° C. Preferably, the SOx sorbent component is capable of desorbing $SO_x$ over $NO_x$ in a temperature range from about 500° C. to about 700° C., preferably in a temperature range from about 520° C. to about 658° C., more preferably in a temperature range from about 535° C. to about 675° C., and most preferably in a temperature range from about 550° C. to about 650° C. Nonlimiting illustrative examples of SOx sorbent components may be selected from the group consisting of oxides and aluminum oxides of lithium, magnesium, calcium, manganese, iron, cobalt, nickel, copper, zinc, and silver. More preferred $SO_x$ sorbent components may be selected from the group consisting of MgO, $MgAl_2O_4$ (or hydrotalcite with $MgO/Al_2O_3$ from 9/1 to 1/9), MnO, $MnO_2$, and $Li_2O$. The most preferred $SO_X$ sorbent components are MgO and $Li_2O$.

The thickness of the $SO_x$ absorbing layer is sufficiently dense and thick so as to create a $SO_x$ diffusion barrier or $SO_x$ sink to protect the bottom $NO_X$ absorbing layer from contacting $SO_x$. The optimum thickness may vary with cpsi (cell density and wall thickness) of the substrates. Preferably, the $SO_x$ absorbing layer should be from about 0.3 g/in³ to about 2.4 g/in³ in loading, more preferably from about 0.8 g/in³ to about 1.8 g/in³.

The first and second supports may be the same or different compounds and may be selected from the group consisting of silica, alumina, and titania compounds. Preferably the first and second supports are activated compounds selected from the group consisting of alumina, silica, silica-alumina, alumino-silicates, alumina-zirconia, alumina-chromia, and alumina-ceria. More preferably, the first and second supports are activated alumina.

The first, layer and second layer compositions may optionally comprise first and second alkaline earth metals which are believed to stabilize the first and second layer compositions, respectively. The first and second alkaline earth metal may be selected from the group consisting of magnesium, barium, calcium and strontium, preferably strontium and barium. Most preferably, the first alkaline earth metal component comprises barium oxide and the second alkaline earth metal component comprises strontium oxide. Stabilization means that the conversion efficiency of the catalyst composition of each layer is maintained for longer period of time at elevated temperatures. Stabilized supports such as alumina and catalytic components such as Noble metals are more resistant to degradation against high temperature exposure thereby maintaining better overall conversion efficiencies.

The first layer and second layer compositions may also optionally comprise first and second rare earth metal components which are believed to act as promoters. The rare earth metal components are derived from a metal selected from the group consisting of lanthanum and neodymium. In a specific embodiment, the first rare earth metal component is substantially lanthana and the second rare earth component is substantially neodymia. The promoter enhances the conversion of the hydrocarbons, carbon monoxide, nitrogen oxides, and sulfur oxides to harmless compounds. Zirconium component in both layers act as both washcoat stabilizer and promoter.

The first layer and second layer compositions may further comprise nickel, manganese, or iron components useful to remove sulfides such as hydrogen sulfides emissions. Most preferably, the first layer comprises a nickel, manganese, or iron compound.

Preferably, the first layer comprises a first support, a first platinum component, a first platinum group metal component other than platinum, and a $NO_X$ sorbent component selected from the group consisting of alkaline earth metal components, alkali metal components, and rare earth metal components, and a first zirconium component. Preferably, the second layer comprises a second support, a $SO_x$ sorbent component having a free energy of formation from about 0 to about -90 Kcal/mole at 350° C., a second platinum component, at least one second platinum group metal component other than platinum, and a second zirconium component. Preferably, at least one of the first or second layers comprises at least one first alkaline earth metal component and at least one first rare earth metal component selected from the group consisting of lanthanum metal components and neodymium metal components.

When the compositions are applied as a thin coating to a monolithic carrier substrate, the proportions of ingredients are conventionally expressed as grams of material per cubic inch (g/in³) of the catalyst and the substrate. This measure accommodates different gas flow passage cell sizes in different monolithic carrier substrates. Platinum group metal components are based on the weight of the platinum group metal.

A useful and preferred first layer has from about 0.15 g/in³ to about 2.0 g/in³ of the first support; (ii) at least about 1 g/ft³ of the first platinum component; (iii) at least about 1 g/ft³ of a first platinum group metal component other than platinum; (iv) from about 0.025 g/in³ to about 0.5 g/in³ of a $NO_x$ sorbent component selected from the group consisting of alkaline earth metal oxides, alkali metal oxides, and rare earth metal oxides; and (v) from about 0.025 g/in³ to about 0.5 g/in³ of a first zirconium component; and from 0.0 and preferably about 0.025 g/in³ to about 0.5 g/in³ of at least one first rare earth metal component selected from the group consisting of ceria metal components, lanthanum metal components and neodymium metal component.

A useful and preferred second layer has from about 0.15 g/in³ to about 2.0 g/in³ of the second support; (ii) from about 0.3 g/in³ to about 1.8 g/in³ of the $SO_x$ sorbent component; (iii) at least about 1 g/ft³ of a second platinum group component; (iv) at least about 1 g/ft³ of a second platinum group metal component other than platinum; and (v) from about 0.025 g/in³ to about 0.5 g/in³ of a second zirconium component.

The specific construction of layers having the first and second compositions in the layered catalyst composites set out above results in an effective three-way catalyst that reversibly traps sulfur oxide contaminants present and thereby prevents the sulfur oxide contaminants from poisoning the three-way conversion catalysts. The layered catalyst composite can be in the form of a self-supported article such as a pellet with the first layer on the inside and the second layer on the outside of the pellet. Alternatively, and more preferably, the first layer is supported on a carrier, also referred to as a substrate, preferably a honeycomb substrate, and the second layer is supported on the first layer applied to the substrate.

In a second embodiment, the structure of the layered catalyst composite of the present invention is designed in an axial arrangement wherein there is an upstream section and a downstream section. The upstream section comprises an upstream substrate and a first layer on the upstream substrate. The downstream section comprises a downstream substrate and a first layer on the downstream substrate. Exhaust gaseous emissions comprising hydrocarbons, carbon monoxide, nitrogen oxides, and sulfur oxides first encounter the upstream section, and secondly encounter the downstream section. The first layer comprises a first support; at least one first platinum component; optionally a first platinum group metal component other than platinum; optionally a first zirconium component; and optionally a $NO_X$ sorbent component selected from the group consisting of alkaline earth metal components, alkali metal components, and rare earth metal components. The second layer comprises a second support; a $SO_x$ sorbent component having a free energy of formation from about 0 to about -90 Kcal/mole at 350° C.; optionally at least one second platinum component; optionally a second platinum group metal component other than platinum; and optionally a second zirconium component. Upon passing through the upstream section, the exhaust gas becomes depleted in $SO_x$ and then contacts the downstream section. In the downstream section, the three-way conversion catalyst/$NO_x$ sorbent stores $NO_x$ during lean periods and releases and reduces stored $NO_x$ during rich periods.

The layered catalyst composites of the present invention may also comprise several layers of several different basic metal oxide components which may be designed in a radial arrangement or an axial arrangement. In this embodiment, the less basic metal oxide components are utilized in the top layers or upstream sections and the more basic metal oxide components are utilized in the bottom layers or downstream sections to provide an alkaline gradient of basic metal oxides. The top layers or upstream sections serve mainly to absorb $SO_x$ and the bottom layers or downstream sections serve to absorb $NO_x$.

In a specific second embodiment, the present invention pertains to an axial layered catalyst composite comprising an upstream section and a downstream section:
(1) the downstream section comprising:
   (a) a downstream substrate; and
   (b) a first layer on the downstream substrate, the first layer comprising a first support and a first platinum component;
(2) the upstream section comprising:
   (a) an upstream substrate; and
   (b) a second layer on the upstream substrate, the second layer comprising a second support and a $SO_x$ sorbent component having a free energy of formation from about 0 to about −90 Kcal/mole at 350° C.

In a third embodiment, the present invention is directed to a radial layered catalyst composite comprising a bottom, a first middle, and a top layer. Exhaust gaseous emissions comprising hydrocarbons, carbon monoxide, nitrogen oxides, and sulfur oxides first encounter the top layer, secondly the first middle layer, and thirdly the bottom layer. The bottom layer comprises a first support; at least one first platinum component; a first $NO_x$ sorbent component selected from the group consisting of cesium components, potassium components, and cerium components; optionally a first platinum group metal component other than platinum; and optionally a first zirconium component. The first middle layer comprises a second support; at least one second metal oxide which is selected from the group consisting of BaO and MgO; optionally a second platinum component; optionally a second platinum group metal component other than platinum; and optionally a second zirconium component. The top layer comprises a third support; at least one third metal oxide component which is $MgAl_2O_4$; optionally a third platinum component; optionally a third platinum group metal component other than platinum; and optionally a third zirconium component. In one embodiment, the second metal oxide in the first middle layer is BaO. In another embodiment, the second metal oxide in the first middle layer is MgO. The $NO_x$ sorbent component in the bottom layer is preferably a composite of $Cs_2O/K_2O/CeO_2$.

In this third embodiment, preferably the first middle layer comprises a SOx sorbent component which is MgO. Preferably, the radial layered catalyst composite further comprises a second middle layer located between the bottom layer and the first middle layer. Exhaust gaseous emissions comprising hydrocarbons, carbon monoxide, nitrogen oxides, and sulfur oxides first encounter the top layer, then the first middle layer, next the second middle layer, and finally the bottom layer. The second middle layer comprises a fourth support; and a fourth metal oxide which is BaO; optionally a fourth platinum component; optionally a fourth platinum group metal component other than platinum; and optionally a fourth zirconium component.

In specific third embodiment, the present invention pertains to a radial layered catalyst composite comprising a bottom layer, a first middle layer, and a top layer:
(a) the bottom layer comprising:
   (i) a first support;
   (ii) a first platinum component;
   (iii) a first $NO_x$ sorbent component selected from the group consisting of cesium components, potassium components, and cerium components; and
(b) the first middle layer comprising:
   (i) a second support;
   (ii) a second $SO_x$ sorbent component which is selected from the group consisting of BaO and MgO; and
(c) the top layer comprising:
   (i) a third support;
   (ii) a third $SO_x$ sorbent component which is $MgAl_2O_4$.

Preferably, the radial layered catalyst composite in this embodiment further includes the following:
(3) the first middle layer comprises a $SO_x$ sorbent component which is MgO; and
further comprising a second middle layer located between the bottom layer and the first middle layer:
(d) the second middle layer comprising:
   (i) a fourth support; and
   (ii) a $SO_x$ sorbent component which is BaO.

In a fourth embodiment, the present invention is directed to an axial layered catalyst composite having an upstream section, a midstream section, and a downstream section. Exhaust gaseous emissions comprising hydrocarbons, carbon monoxide, nitrogen oxides, and sulfur oxides first encounter the upstream section, then the midstream section, and finally the downstream section. The downstream section comprises a downstream substrate and a first layer on the downstream substrate. The first layer comprises a first support; at least one first platinum component; at least one $NO_x$ sorbent component which is selected from the group consisting of cesium components, potassium components, and cerium components; optionally a first platinum group metal component other than platinum; and optionally a first zirconium component. The upstream section comprises an upstream substrate and a second layer on the upstream substrate. The second layer comprises a second support; a SOx sorbent component which is $MgAl_2O_4$; optionally a second platinum component; optionally a second platinum group metal component other than platinum; and optionally a second zirconium component. The first midstream section, located between the upstream section and the downstream section, comprises a first midstream substrate and a third layer on the first midstream substrate. The third layer comprises a third support; a third metal oxide which is selected from the group consisting of BaO and MgO; optionally a third platinum component; optionally a platinum group metal component other than platinum; and optionally a third zirconium component. In one embodiment, the third metal oxide in the third layer is BaO. In another embodiment, the third metal oxide in the third layer is MgO. The $NO_x$ sorbent component in the first layer is preferably a composite of $Cs_2O/K_2O/CeO_2$.

In this fourth embodiment, preferably the third layer on the first midstream substrate of the axial layered catalyst composite comprises a third metal oxide component which is MgO. Preferably, the axial layered catalyst composite further comprises a second midstream section located between the downstream section and the first midstream section. Exhaust gaseous emissions comprising hydrocarbons, carbon monoxide, nitrogen oxides, and sulfur oxides first encounter the upstream section, then the first midstream section, next the second midstream section, and finally the downstream section. The second midstream section comprises a second midstream substrate and a fourth layer on the second midstream substrate. The fourth layer comprises a fourth support; a fourth metal oxide which is BaO; optionally a fourth platinum component; optionally a fourth platinum group metal component other than platinum; and optionally a fourth zirconium component.

Preferably, the axial layered catalyst composite in this embodiment further includes the following:
(1) the first layer on the downstream substrate further comprises a $NO_X$ sorbent component selected from the group consisting of cesium components, potassium components, and cerium components; and
(2) the second layer on the upstream substrate comprises a $SO_x$ sorbent component which is $MgAl_2O_4$; and further comprising a first midstream section located between the upstream section and the downstream section:
(3) the first midstream section comprising:
  (a) a first midstream substrate; and
  (b) a third layer on the first midstream substrate, the third layer comprising:
    (i) a third support; and
    (ii) a third $SO_x$ sorbent component which is selected from the group consisting of BaO and MgO.

More preferably, the axial layered catalyst composite in this embodiment further includes the following:
(1) the third layer on the first midstream substrate comprises a third $SO_X$ sorbent component which is MgO; and further comprising a second midstream section located between the downstream section and the first midstream section:
(2) the second midstream section comprising:
  (a) a second midstream substrate; and
  (b) a fourth layer on the second midstream substrate, the fourth layer comprising:
    (i) a fourth support;
    (ii) a fourth $SO_x$ sorbent which is BaO.

The front or upstream longitudinal portion of the axial layered catalyst composite, the portion end to which the exhaust stream being treated is first introduced, preferably excludes the $NO_x$ sorbents which, when used, are relegated to a rear or downstream portion of the axial layered catalyst composite. For example, a typical so-called honeycomb-type carrier member comprises a "brick" of material such as cordierite or the like, having a plurality of fine, gas-flow passages extending from the front portion to the rear portion of the carrier member. These fine gas-flow passages, which may number from about 100 to 900 passages or cells per square inch of face area ("cpsi"), have a catalytic trap material coated on the walls thereof. Preferably, the $NO_x$ sorbent is utilized on the rear longitudinal segment of the carrier member so as to prevent the sulfur oxide contaminants from poisoning the three-way conversion catalysts. Typically, the first (front or upstream) 80% to 20% of the longitudinal length of the carrier member is kept substantially free of the $NO_x$ sorbents which are relegated to the rear 20% to 80% of the length of the catalytic trap. The same effect may be attained by using two separate carrier members in series, the first or upstream member being devoid of $NO_x$ sorbents, which may be contained in a second or downstream carrier member.

The present invention also includes a method for treating an exhaust gas stream which comprises the step of contacting the gas stream comprising carbon monoxide and/or hydrocarbons, nitrogen oxides, and sulfur oxides with the layered catalyst composite set out above. The present invention also includes a method of treating an exhaust gas stream comprising the steps of contacting the stream with the layered catalyst composite set out above under alternating periods of lean and stoichiometric or rich operation. Contacting is carried out under conditions whereby at least some of the $SO_x$ in the exhaust gas stream is trapped in the catalytic material during the periods of lean operation and is released and reduced during the periods of stoichiometric or rich operation.

In a specific embodiment, the present invention pertains to a method for removing $NO_x$ and $SO_x$ contaminants from a gaseous stream comprising the steps of:
(A) in a sorbing period, passing a lean gaseous stream within a sorbing temperature range through a layered catalyst composite comprising a first layer and a second layer:
  (a) the first layer comprising a first support and a first platinum component; and
  (b) the second layer comprising a second support and a $SO_x$ sorbent component having a free energy of formation from about 0 to about −90 Kcal/mole at 350° C.;
to sorb at least some of the $SO_x$ contaminants into the second layer and thereby provide a $SO_x$ depleted gaseous stream exiting the second layer and entering the first layer, wherein the first layer sorbs and abates the $NO_x$ in the gaseous stream; and
(B) in a desorbing period, converting the lean gaseous stream to a rich gaseous stream and raising the temperature of the gaseous stream to within a desorbing temperature range to thereby reduce and desorb at least some of the $SO_X$ contaminants from the second layer and thereby provide a $SO_x$ enriched gaseous stream exiting the second layer, preferably at high VHSV (space velocity)to reduce contact time of $SO_x$ with downstream catalytic layers.

In another specific embodiment, the present invention pertains to a method for removing $NO_x$ and $SO_x$ contaminants from a gaseous stream comprising the steps of:
(A) in a sorbing period, passing a lean gaseous stream within a sorbing temperature range through an axial layered catalyst composite comprising an upstream section and a downstream section:
(1) the downstream section comprising:
  (a) a downstream substrate; and
  (b) a first layer on the downstream substrate, the first layer comprising a first support and a first platinum component;
(2) the upstream section comprising:
  (a) an upstream substrate; and
  (b) a second layer on the upstream substrate, the second layer comprising a second support and a $SO_x$ sorbent component having a free energy of formation from about 0 to about −90 Kcal/mole at 350° C.;
to sorb at least some of the $SO_x$ contaminants into the upstream section and thereby provide a $SO_x$ depleted gaseous stream exiting the upstream section and entering the downstream section, wherein the downstream section sorbs and abates the $NO_x$ in the gaseous stream; and
(B) in a desorbing period, converting the lean gaseous stream to a rich gaseous stream and raising the temperature of the gaseous stream to within a desorbing temperature range to thereby reduce and desorb at least some of the $SO_X$ contaminants from the upstream section and thereby provide a $SO_x$ enriched gaseous stream exiting the upstream section, preferably at high VHSV (space velocity)to reduce contact time of $SO_x$ with downstream catalytic layers.

More preferably, the method in this embodiment further includes the following:
(1) the first layer on the downstream substrate further comprises a $NO_X$ sorbent component selected from the group consisting of cesium components, potassium components, and cerium components; and
(2) the second layer on the upstream substrate comprises a $SO_x$ sorbent component which is $MgAl_2O_4$; and
further comprising a first midstream section located between the upstream section and the downstream section:

(3) the first midstream section comprising:
  (a) a first midstream substrate; and
  (b) a third layer on the first midstream substrate, the third layer comprising:
    (i) a third support; and
    (ii) a third $SO_x$ sorbent component which is selected from the group consisting of BaO and MgO;
to sorb at least some of the $SO_x$ contaminants into the first midstream section and thereby provide a $SO_x$ depleted gaseous stream exiting the first midstream section and entering the downstream section, wherein the downstream section sorbs and abates the $NO_x$ in the gaseous stream; and
(B) in a desorbing period, converting the lean gaseous stream to a rich gaseous stream and raising the temperature of the gaseous stream to within a desorbing temperature range to thereby reduce and desorb at least some of the $SO_X$ contaminants from the first midstream section and thereby provide a $SO_x$ enriched gaseous stream exiting the first midstream section.

In yet another specific embodiment, the present invention pertains to a method for removing $NO_x$ and $SO_x$ contaminants from a gaseous stream comprising the steps of:
(A) in a sorbing period, passing a lean gaseous stream within a sorbing temperature range through a radial layered catalyst composite comprising a bottom layer, a first middle layer, and a top layer:
(a) the bottom layer comprising:
  (i) a first support;
  (ii) a first platinum component;
  (iii) a first $NO_x$ sorbent component selected from the group consisting of cesium components, potassium components, and cerium components; and
(b) the first middle layer comprising:
  (i) a second support;
  (ii) a second $SO_x$ sorbent component which is selected from the group consisting of BaO and MgO; and
(c) the top layer comprising:
  (i) a third support;
  (ii) a third $SO_x$ sorbent component which is $MgAl_2O_4$;
to sorb at least some of the $SO_x$ contaminants into the top and first middle layers and thereby provide a $SO_x$ depleted gaseous stream exiting the top and first middle layers and entering the bottom layer, wherein the bottom layer sorbs and abates the $NO_x$ in the gaseous stream; and
(B) in a desorbing period, converting the lean gaseous stream to a rich gaseous stream and raising the temperature of the gaseous stream to within a desorbing temperature range to thereby reduce and desorb at least some of the $SO_X$ contaminants from the top and first middle layers and thereby provide a $SO_X$ enriched gaseous stream exiting the top and first middle layers, preferably at high VHSV (space velocity) to reduce contact time of Sox with downstream catalytic layers.

More preferably, the method in this embodiment further includes the following:
(3) the first middle layer comprises a $SO_x$ sorbent component which is MgO; and
further comprising a second middle layer located between the bottom layer and the first middle layer:
(d) the second middle layer comprising:
  (i) a fourth support; and
  (ii) a $SO_x$ sorbent component which is BaO;
to sorb at least some of the $SO_x$ contaminants into the second middle layer and thereby provide a $SO_x$ depleted gaseous stream exiting the second middle layer and entering the bottom layer, wherein the bottom layer sorbs and abates the $NO_x$ in the gaseous stream; and (B) in a desorbing period, converting the lean gaseous stream to a rich gaseous stream and raising the temperature of the gaseous stream to within a desorbing temperature range to thereby reduce and desorb at least some of the $SO_X$ contaminants from the second middle layer and thereby provide a $SO_x$ enriched gaseous stream exiting the second layer.

The present invention also includes a method for preparing the layered catalyst composite of the present invention which involves forming the first and second layers and then coating the first layer with the second layer. The present invention further includes a method of forming a layered catalyst composite which comprises the steps of (a) combining at least one water-soluble or dispersible first platinum component and a finely divided, high surface area refractory oxide with an aqueous liquid to form a first solution or dispersion which is sufficiently dry to absorb essentially all of the liquid; (b) optionally mixing the first solution or dispersion with a first water-soluble or dispersible platinum group metal component other than a platinum component, a first zirconium component, and a $NO_x$ sorbent component selected from the group consisting of alkaline earth metal components, alkali metal components, and rare earth metal components; (c) forming a first layer of the first solution or dispersion on a substrate; (d) converting the first platinum component and the optional first platinum group metal component other than platinum in the resulting first layer to a water-insoluble form (either by heat or pH change); (e) combining at least one water-soluble or dispersible SOx sorbent component, capable of selectively absorbing $SO_x$ over $NO_x$ in a temperature range from about 100° C. to about 600° C. and capable of desorbing $SO_x$ in a temperature range from about 500° C. to about 700° C., and a finely divided, high surface area refractory oxide with an aqueous liquid to form a second solution or dispersion which is sufficiently dry to absorb essentially all of the liquid; (f) optionally mixing the second solution or dispersion with a water-soluble or dispersible second platinum component, second platinum group metal component other than platinum, and a second zirconium component; (g) forming a second layer of the second solution or dispersion on the first layer; and (h) converting the second platinum component and the optional second platinum group metal component other than platinum in the resulting second layer to a water-insoluble form.

In a specific embodiment, the present invention pertains to a method of forming a layered catalyst composite which comprises the steps of:
(a) forming a first layer comprising:
  (i) a first support; and
  (ii) a first platinum component; and
(b) coating the first layer with a second layer comprising:
  (i) a second support; and
  (ii) a $SO_x$ sorbent component having a free energy of formation from about 0 to about −90 Kcal/mole at 350° C.

In another specific embodiment, the present invention pertains to a method of forming a layered catalyst composite which comprises the steps of:
(a) combining a water-soluble or dispersible (a suspension of) first platinum component and a finely divided, high surface area refractory oxide with an aqueous liquid to form a first solution or dispersion which is sufficiently dry to absorb essentially all of the liquid;
(b) forming a first layer of the first solution or dispersion on a substrate;
(c) converting the first platinum component in the resulting first layer to a water-insoluble form;
(d) combining a water-soluble or dispersible $SO_x$ sorbent component having a free energy of formation from about 0 to about −90 Kcal/mole at 350° C., and a finely divided, high surface area refractory oxide with an aqueous liquid to form a second solution or dispersion which is sufficiently dry to absorb essentially all of the liquid;

(e) forming a second layer of the second solution or dispersion on the first layer; and (f) converting the second platinum component in the resulting second layer to a water-insoluble form.

As used herein, the following terms, whether used in singular or plural form, have the meaning defined below.

The term "catalytic metal component", or "platinum metal component", or reference to a metal or metals comprising the same, means a catalytically effective form of the metal or metals, whether the metal or metals are present in elemental form, or as an alloy or a compound, e.g., an oxide.

The term "component" or "components" as applied to $NO_x$ sorbents means any effective $NO_x$-trapping forms of the metals, e.g., oxygenated metal compounds such as metal hydroxides, mixed metal oxides, metal oxides or metal carbonates.

The term "gaseous stream" or "exhaust gas stream" means a stream of gaseous constituents, such as the exhaust of an internal combustion engine, which may contain entrained non-gaseous components such as liquid droplets, solid particulates, and the like.

The terms "g/in$^3$" or "g/ft$^3$" or "g/ft$^3$" used to describe weight per volume units describe the weight of a component per volume of catalyst or trap member including the volume attributed to void spaces such as gas-flow passages.

The term "lean" mode or operation of treatment means that the gaseous stream being treated contains more oxygen that the stoichiometric amount of oxygen needed to oxidize the entire reductants content, e.g., HC, CO and $H_2$, of the gaseous stream.

The term "mixed metal oxide" means bimetallic or multimetallic oxygen compounds, such as $Ba_2SrWO_6$, which are true compounds and is not intended to embrace mere mixtures of two or more individual metal oxides such as a mixture of SrO and BaO.

The term "platinum group metals" means platinum, rhodium, palladium, ruthenium, iridium, and osmium.

The term "selectively absorbing SOx over NOx" means that the SOx traps are sufficiently selective to absorb SOx over NOx so that the SOx traps will not be saturated with nitrate salts in the lean mode and consequently lose their SOx-trap capacity. In some cases, SOx trap materials can only form stable sulfate but not nitrate. For example, Mg, Mn, Cu, or Ni can selectively absorb SOx over NOx at 350° C., respectively.

The term "sorb" means to effect sorption.

The term "stoichiometric/rich" mode or operation of treatment means that the gaseous stream being treated refers collectively to the stoichiometric and rich operating conditions of the gas stream.

The abbreviation "TOS" means time on stream.

The term "washcoat" has its usual meaning in the art of a thin, adherent coating of a catalytic or other material applied to a refractory carrier material, such as a honeycomb-type carrier member, which is sufficiently porous to permit the passage therethrough of the gas stream being treated.

Other aspects of the invention are disclosed in the following detailed description of embodiments of the invention.

BRIEF DESCRIPTION OF THE FIGURES

FIG. 1 shows the free energy of formation of nitrates, sulfates, and nitrites in Kcal/mole at 350° C.

FIG. 2 shows the free energy of formation in Kcal/mole at 350° C., 650° C., 750° C., and 850° C. for sulfates.

DETAILED DESCRIPTION OF THE INVENTION AND SPECIFIC EMBODIMENTS THEREOF

The present invention is directed to a layered catalyst composite of the type useful as a three-way conversion catalyst (TWC). The TWC catalyst composite of the present invention simultaneously catalyzes the oxidation of hydrocarbons and carbon monoxide and the reduction of nitrogen oxides and sulfur oxides in a gas exhaust stream. The layered catalyst composites of the present invention have a sulfur oxide absorbing layer which selectively and reversibly absorbs sulfur oxides over nitrogen oxides and thereby prevents or alleviates sulfur oxide poisoning of the three-way conversion catalyst.

The reduction of $NO_x$ from the exhaust of lean-burn engines, such as gasoline direct injection and partial lean-burn engines, as well as from diesel engines, requires trapping and storing of $NO_x$ under lean engine operating conditions and releasing and reducing the $NO_x$ under stoichiometric or rich engine operating conditions. The lean operating cycle is typically between 1 minute to 3 hours and the rich operating cycle is typically small (1 to 5 seconds) to preserve as much fuel as possible. The short and frequent regeneration is favored over long but less frequent regeneration. A three-way conversion catalyst generally must provide a $NO_x$ trap function and a catalyst function. Without wishing to be bound by a particular theory, it is believed that catalytic traps function in the following manner.

At lean engine operating conditions, the following reactions are promoted.

Oxidation of NO to $NO_2$

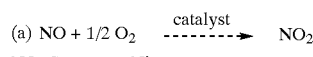

(a) $NO + 1/2 O_2 \xrightarrow{catalyst} NO_2$ $NO_x$ Storage as Nitrate

(b) $2NO_2 + MCO_3 + 1/2 O_2 \longrightarrow M(NO_3)_2 + CO_2$

Reaction (a) is typically catalyzed by metal oxides or precious metals such as platinum and/or palladium catalytic components. Reaction (b) is typically promoted by a basic $NO_x$ sorbent ($MCO_3$) which is generally a carbonate or oxide of sodium, potassium, strontium, barium, etc. For example, when $BaCO_3$ is the $NO_x$ sorbent ($MCO_3$), $M(NO_3)_2$ is $Ba(NO_3)_2$.

At stoichiometric or rich engine operating conditions, the following reactions are promoted.

$NO_x$ Release

(c) $M(NO_3)_2 + 2CO \longrightarrow MCO_3 + NO_2 + NO + CO_2$ $NO_x$ Reduction to $N_2$

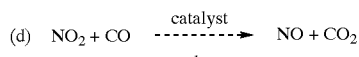

(d) $NO_2 + CO \xrightarrow{catalyst} NO + CO_2$

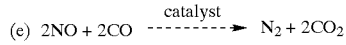

(e) $2NO + 2CO \xrightarrow{catalyst} N_2 + 2CO_2$

Reaction (c) releases $NO_x$ and regenerates the basic $NO_x$ sorbent ($MCO_3$). Reactions (d) and (e) are typically catalyzed by metal oxides or precious metals such as platinum and/or palladium catalytic components. In addition to carbon monoxide in reactions (d) and (e), unburned hydrocarbon contaminants or hydrogen may also act as the reducing agent.

When $SO_x$ contaminants are present in the exhaust gaseous stream, the $SO_x$ contaminants compete with $NO_x$ and poison the basic $NO_x$ sorbents. When $SO_x$ contaminants are present in the exhaust stream, the following reactions are promoted.

Oxidation of $SO_2$ to $SO_3$ (f) $SO_2 + 1/2 O_2 \xrightarrow{\text{catalyst}} SO_3$ $SO_x$ Storage as Sulfate (g) $SO_3 + MCO_3 \longrightarrow MSO_4 + CO_2$ Reaction (f), like reaction (a), is typically catalyzed by metal oxides or precious metals. In reaction (g), $SO_x$ occupies sites for $NO_x$ storage in the basic $NO_x$ sorbent ($MCO_3$) and replaces $CO_3$ or $NO_3$.

In accord with the present invention, layered catalyst composites are provided having a sulfur oxide absorbing layer before or above a nitrogen oxide absorbing layer. The sulfur oxide absorbing layer selectively and reversibly absorbs sulfur oxides over nitrogen oxides and thereby hinders or prevents sulfur oxide poisoning of the three-way conversion catalyst. The layered catalyst composite comprises a first layer having a first support and a first layer composition and a second layer having a second support and a second layer composition. The first layer composition comprises a first platinum component. The second layer composition comprises a $SO_x$ sorbent component having a free energy of formation from about 0 to about −90 Kcal/mole at 350° C. The SOx sorbent component is capable of selectively absorbing $SO_x$ over $NO_x$ in a temperature range from about 100° C. to about 600° C. and capable of desorbing $SO_x$ in a temperature range from about 500° C. to about 700° C. The gas stream initially encounters the second, top, or outer layer composition which is designed to reversibly trap sulfur oxide contaminants over a wide range of temperatures and thereby prevent the contaminants from contacting and poisoning the three-way conversion catalyst. The gas then passes to the first, bottom, or inner layer where the three-way conversion catalyst converts the remaining pollutants.

The first layer composition and second layer composition respectively comprise a first support and a second support which can be the same or different components. The support is made of a high surface area refractory oxide support. Useful high surface area supports include one or more refractory oxides. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 30 to 300 m²/g.

The first layer and second layer compositions comprise alumina, catalytic components, stabilizers, reaction promoters and, if present, other modifiers and excludes the carrier or substrate. When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. For typical automotive exhaust gas catalytic converters, the catalyst composite which includes a monolithic substrate generally may comprise from about 0.50 to about 6.0, preferably about 1.0 to about 5.0 g/in³ of catalytic composition coating.

In a preferred method of preparing the catalyst, a platinum component, and optionally a platinum group metal component other than platinum, such as a suitable compound and/or complex of the platinum group metals may be utilized to achieve dispersion of the catalytic component on activated alumina support particles. As used herein, the term "platinum and optional platinum group metal component" means any platinum and optional platinum metal compound, complex, or the like which, upon calcination or use of the catalyst decomposes or otherwise converts to a catalytically active form, usually, the metal or the metal oxide. Water-soluble compounds or water dispersible compounds or complexes of platinum group metals may be utilized as long as the liquid used to impregnate or deposit the catalytic metal compounds onto alumina support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum and optional platinum group metals are preferred. For example, suitable compounds are chloroplatinic acid, amine solubilized platinum hydroxide, platinum nitrate or platinum chloride, rhodium chloride, rhodium nitrate, hexamine rhodium chloride, etc. During the calcination step, or at least during the initial phase of use of the catalyst, such compounds are converted into a catalytically active form of the platinum group metal or a compound thereof.

In addition to the above listed components of the first layer composition and the second layer composition, it is optional that each layer contain a particular composite of zirconia and at least one rare earth oxide containing ceria. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

Both the first layer composition and second layer composition may comprise a component which impart stabilization, preferably a first stabilizer in the first layer and second stabilizer in the second layer. The stabilizer is selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the first layer and second layer composition of the present invention use alkaline earth metal components. The alkaline earth metal components are preferably alkaline earth metal oxide. In a particularly preferred composition, it is desirable to use barium and strontium as the compound in the first and/or the second layer composition. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides.

One aspect of the present invention provides for applying one or more thermal stabilizers and/or catalytic promoter to a previously calcined coating of the activated alumina and catalytic components on a carrier substrate. In other aspects of the invention, one or more additives may be applied to the activated alumina either before or after the alumina particles are formed into an adherent, calcined coating on the carrier substrate. (As used herein, a "precursor", whether of a thermal stabilizer, or other modifier or other component, is a compound, complex or the like which, upon calcining or upon use of the catalyst, will decompose or otherwise be converted into, respectively, a thermal stabilizer, other modifier or other component.) The presence of one or more of the metal oxide thermal stabilizers tends to retard the phase transition of high surface area aluminas such as gamma and eta aluminas to alpha-alumina, which is a low surface area alumina. The retardation of such phase transformation tends to prevent or reduce the occlusion of the catalytic metal component by the alumina with the consequent decrease of catalytic activity.

In each of the first layer and second layer compositions, the amount of metal oxide thermal stabilizer combined with the alumina may be from about 0.05% to 30% by weight, preferably from about 0.1% to 25% by weight, based on the total weight of the combined alumina, stabilizer and catalytic metal component.

Additionally, both the first layer composition and the second layer composition may contain a compound derived from zirconium, preferably zirconium oxide. The zirconium compound can be provided as a water-soluble compound such as zirconium acetate or as a relatively insoluble compound such as zirconium hydroxide. There should be an amount sufficient to enhance the stabilization and promotion of the respective compositions.

Both the first layer composition and the second layer composition may contain at least one first promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia in the bottom layer, and neodymia or optionally lanthana in the top coat. While these compounds are known to act as stabilizers for the alumina support, their primary purpose in the composition of the present invention is to act as reaction promoters for the respective first and second layer compositions. A promoter is considered to be a material which enhances the conversion of a desired chemical to another. In a TWC, the promoter enhances the catalytic conversion of carbon monoxide and hydrocarbons into water and carbon dioxide and nitrogen oxides into nitrogen.

The first and second layers preferably contain lanthanum and/or neodymium in the form of their oxides. However, these compounds are preferably initially provided in a soluble form such as an acetate, halide, nitrate, sulfate or the like to impregnate the solid components for conversion to oxides. It is preferred that in both the top coat and the bottom coat that the promoter be in intimate contact with the other components in the composition including and particularly the platinum group metal.

The first layer composition and/or the second layer composition of the present invention may contain other conventional additives such as sulfide suppressants, e.g., nickel or iron components. If nickel oxide is used, an amount from about 1% to 25% by weight of the first coat can be effective, as disclosed in U.S. Pat. No. 5,057,483 which disclosure is hereby incorporated by reference.

A particularly useful layered catalyst composite of the present invention comprises in the first layer (i) from about 0.15 g/in3 to about 2.7 g/in3 of the first support; (ii) at least about 1 g/ft3 of the first platinum component; (iii) at least about 1 g/ft3 of a first platinum group metal component other than platinum; (iv) from about 0.025 g/in3 to about 0.7 g/in3 of a NOx sorbent component selected from the group consisting of alkaline earth metal oxides, alkali metal oxides, and rare earth metal oxides; and (v) from about 0.025 g/in3 to about 0.7 g/in3 of a first zirconium component. A useful layered catalyst composite of the present invention comprises in the second layer (i) from about 0.15 g/in3 to about 2.7 g/in3 of the second support; (ii) from about 0.3 g/in3 to about 1.8 g/in3 of the SOx sorbent component; (iii) at least about 1 g/ft3 of a second platinum group component; (iv) at least about 1 g/ft3 of a second platinum group metal component other than platinum; and (v) from about 0.025 g/in3 to about 0.7 g/in3 of a second zirconium component. The weight of the platinum component and other platinum group metal components are based on the weight of the metal.

The catalyst composite can be coated in layers on a monolithic substrate generally which can comprise from about 0.50 g/in$^3$ to about 6.0 g/in$^3$, preferably about 1.0 g/in$^3$ to about 5.0 g/in$^3$ of catalytic composition based on grams of composition per volume of the monolith.

The catalyst composite of the present invention can be made by any suitable method. A preferred method comprises mixing a first mixture of a solution of at least one water-soluble or dispersible, first platinum component and a finely-divided, high surface area, refractory oxide which is sufficiently dry to absorb essentially all of the solution. The first platinum group metal component other than platinum, when used, can be supported on the same or different refractory oxide particles as the platinum component. The first supported platinum and other components are then added to water and preferably comminuted to form the first coat (layer) slurry. The first supported platinum group component other than platinum may be comminuted with the first supported platinum component, or separately and combined with the other components to form the first coat slurry. Preferably, the slurry is acidic, having a pH of less than 7 and preferably from 3 to 7. The pH is preferably lowered by the addition of an acid, preferably acetic acid to the slurry. In particularly preferred embodiments the first coat slurry is comminuted to result in substantially all of the solids having particle sizes of less than 10 micrometers in average diameter. The first coat slurry can be formed into a first layer and dried. The first platinum component and optional first platinum group metal component other than platinums in the resulting first mixture in the first layer are converted to a water-insoluble form chemically or by calcining. The first layer is preferably calcined, preferably at a temperature of at least 250° C.

A second mixture of a solution of at least one SOx sorbent component capable of selectively absorbing $SO_x$ over $NO_x$ and a finely-divided, high surface area, refractory oxide which is sufficiently dried to absorb essentially all of the solution is mixed. The water-soluble second platinum component and second platinum group metal component, when used, may be supported on the same or different refractory oxide particles as the platinum component. Preferably, rhodium components are supported on different refractory oxide particles other than the platinum component. The supported SOx sorbent component and other components are added to water and are preferably comminuted to form the second coat slurry. The supported platinum component and second platinum group metal component other than platinum may be comminuted together or separately and then combined with the supported SOx sorbent component and other components to form the second coat slurry. Preferably, the second slurry is acidic, having a pH of less than 7 and preferably from 3 to 7. The pH is preferably lowered by the addition of an acid, preferably nitric acid to the slurry. In particularly preferred embodiments the second coat slurry is comminuted to result in substantially all of the solids having particle sizes of less than 10 micrometers in average diameter. The second slurry can be formed into a second layer on the first layer and dried. The SOx sorbent component, second platinum component, and second platinum group metal component other than platinum in the resulting second coat mixture can be converted to insoluble form chemically or by calcining. The second layer is preferably then calcined, preferably at a temperature of least 250° C.

Alternatively, each layer of the present composite can also be prepared by the method disclosed in U.S. Pat. No. 4,134,860 (incorporated by reference).

In order to deposit the first and second coat slurries on a macrosized carrier, one or more comminuted slurries are applied to the carrier in any desired manner. Thus the carrier may be dipped one or more times in the slurry, with intermediate drying if desired, until the appropriate amount of slurry is on the carrier. The slurry employed in depositing the catalytically-promoting metal component-high area support composite on the carrier will often contain about 20% to 60% by weight of finely-divided solids, preferably about 25% to 55% by weight.

The first layer composition of the present invention and second layer composition of the present invention can be prepared and applied to a suitable substrate, preferably a metal or ceramic honeycomb carrier. The comminuted catalytically-promoting metal component-high surface area support composite can be deposited on the carrier in a desired amount, for example, the composite may comprise about 2% to 40% by weight of the coated carrier, and is preferably about 5% to 30% by weight for a typical ceramic honeycomb structure. The composite deposited on the carrier is generally formed as a coating over most, if not all, of the surfaces of the carrier contacted. The combined structure may be dried and calcined, preferably at a temperature of at least about 250° C. but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as corrugated sheet or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15% by weight of the alloy, for instance, about 10% to 25% by weight of chromium, about 3% to 8% by weight of aluminum and up to about 20% by weight of nickel, say at least about 1% by weight of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, e.g. at least about 500° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 700 or more flow channels ("cells") per square inch of cross section, although far fewer may be used. For example, the carrier may have from about 60 to 600, more usually from about 200 to 400, cells per square inch ("cpsi").

The discrete form and second coats of catalytic material, conventionally referred to as "washcoats", are coated onto a suitable carrier with, preferably, the first coat adhered to the carrier and the second coat overlying and adhering to the first coat. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided on an upstream (as sensed in the direction of gas flow through the catalyst composition) portion of the carrier, with the first coat provided on a downstream portion of the carrier. Thus, to apply the washcoat in this configuration, an upstream longitudinal segment only of the carrier would be dipped into a slurry of the second coat catalytic material, and dried, and the unclipped downstream longitudinal segment of the carrier would then be dipped into a slurry of the first coat catalytic material and dried.

Alternatively, separate carriers may be used, one carrier on which the first coat is deposited and a second carrier on which the second coat is deposited, and then the two separate carriers may be positioned within a canister or other holding device and arranged so that the exhaust gas to be treated is flowed in series first through the catalyst containing the second coat and then through the catalyst containing the first coat thereon. However, as indicated above, it is preferred to utilize a catalyst composition in which the second coat overlies and adheres to the first coat because such configuration is believed both to simplify production of the catalyst composition and to enhance its efficacy.

As set out above, the present invention is directed to a substrate, preferably a honeycomb comprising a plurality of channels defined by the honeycomb walls. The channels, and wall elements are parallel and typically axial to the axis of the substrate. The honeycomb has an inlet end or upstream section and an outlet end or downstream section, with at least some of the channels having a corresponding inlet and outlet. There is a first inlet layer located on the walls and extending for at least part of the length from the inlet end toward the outlet end to an inlet layer axial end. The first inlet layer extends for only part of the length from the inlet end toward the outlet end. The inlet layer comprises a first inlet composition which has been described above. The first inlet layer is coated by a method comprising the steps of passing a fluid containing the first inlet composition into the inlet end of the substrate to form the first inlet layer, and then applying a vacuum to the outlet end while forcing a heated gas stream through the channels from the inlet end without significantly changing the length of the first inlet layer. In certain embodiments, one or more layers can be applied over the entire channel length by conventional methods and used in combination with the method of the present invention.

In a specific and preferred embodiment there can be a second inlet layer located on the walls and extending for at least part of the length from the inlet end toward the outlet end to a second layer axial end. The second inlet layer can be supported directly or indirectly on the first inlet layer for at least part of the length of the first inlet layer. The second layer comprises a second inlet composition which has been described above. The second inlet layer is coated by a method comprising the steps of passing a fluid containing the second inlet composition into the inlet end of the substrate to form the inlet layer and applying a vacuum to the outlet end while forcing a heated gas stream through the channels from the inlet end without significantly changing the length of the second inlet layer.

In another specific embodiment there can be a first outlet layer located on the walls and extending for at least part of the length from the outlet end toward the inlet end to an outlet layer axial end. The first outlet layer extends for only part of the length from the outlet end toward the inlet end. The outlet layer comprises a first outlet composition. The first outlet layer is coated by a method which comprises the steps of passing a fluid containing the first outlet composition into the outlet end of the substrate to form the first outlet layer and applying a vacuum to the outlet end while forcing a heated gas stream through the channels from the outlet end without significantly changing the length of the first outlet layer.

Another embodiment comprises a second outlet layer located on the walls and extending for at least part of the length from the outlet end toward the inlet end to a second layer axial end. The second layer can be supported directly or indirectly on the first outlet layer for at least part of the length of the first outlet layer. The second layer comprises a second outlet composition. The second outlet layer is coated by a method comprising the steps of passing a fluid containing the second outlet composition into the outlet end of the substrate to form the outlet layer, and then applying a vacuum to the outlet end while forcing a heated gas stream through the channels from the outlet end without significantly changing the length of the second outlet layer. In each of the embodiments, for the various layers including the first inlet layer and second inlet layer, and the first outlet layer and second outlet layer the heated gas is preferably air but can be any suitable gas such as nitrogen. The temperature of the heated gas is preferably from about 75° C. to about 400° C. The temperature of the heated gas is preferably from 75° C. to 200° C. to dry the various layers. The temperature of the heated gas is preferably from 200° C. to 400° C. to fix the precious metal component of the various layers. The heated gas is passed over the layers for a sufficient time to dry as to fix the precious metal of compositions of the various layers.

Structurally, the architecture of the layers can vary as desired. For example at least a portion of the first or second inlet layers over laps with at least one of the first or second outlet layers. A zone can also have a continuous gradient of material concentration versus layer thickness. Preferably the substrate has at least two adjacent zones, a first zone and a second zone, each extending axially along the length of conduit. The first zone can extend from the inlet and the second or outlet zone extends from the outlet along a separate length of the conduit than the first zone with each zone comprising the same catalyst architecture within the zone. The adjacent zones have different compositions and/or architecture. In a specific embodiment at least one layer of the first zone, and at least one layer of the second zone overlap to form an intermediate zone between the first zone and the second zone. There can be at least three zones, or there can be an uncoated zone between the first zone and the second zone.

The substrate can comprise a monolithic honeycomb comprising a plurality of parallel channels extending from the inlet to the outlet. The monolith can be selected from the group of ceramic monoliths and metallic monoliths. The honeycomb can be selected from the group comprising flow through monoliths and wall flow monoliths.

In specific embodiments the composition of the layers can include the recited precious metals. At least one layer can contain no precious metal component. A preferred article comprises an inlet layer and an outlet layer. The inlet composition comprises a first inlet refractory oxide composition or composite comprising a first inlet refractory oxide selected from the group consisting of alumina, titania, zirconia and silica, a first inlet rare earth metal oxide and a first inlet precious metal component. The outlet layer comprises an outlet composition which comprises an outlet refractory oxide composition or composite comprising an outlet refractory oxide selected from the group consisting of alumina, titania, zirconia and silica, an outlet rare earth metal oxide and at least one outlet precious metal component.

The present invention includes a method comprising passing an inlet end fluid comprising an inlet end coating composition into a substrate as recited above. For the purpose of the present invention a fluid includes liquids, slurries, solutions, suspensions and the like. The aqueous liquid passes into the channel inlets and extending for at least part of the length from the inlet end toward the outlet end to form an inlet end layer coating, with at least one inlet end coating extending for only part of the length from the inlet end toward the outlet end. A vacuum is applied to the outlet end while forcing a gas stream through the channels from the inlet end after the formation of each inlet end coating without significantly changing the length of each inlet layer coating. At least one outlet end aqueous fluid comprising at least one outlet end coating composition is passed into the substrate through the at least some of the channel outlets at the substrate outlet end. The aqueous liquid passes into the channels and extending for at least part of the length from the outlet end toward the inlet end to form at least one outlet end layer coating. The method can further comprise applying a vacuum to the inlet end while forcing a gas stream through the channels from the outlet end after the formation of each outlet end coating without significantly changing the length of each outlet layer coating.

The method can further comprise the step of fixing the precious metal component selected from the inlet precious metal component of the inlet layer and the outlet precious metal component of the outlet layer to the respective inlet or outlet component selected from the inlet refractory oxide and inlet rare earth metal oxide components and the outlet refractory oxide and outlet rare earth metal oxide components. The fixing can be conducted prior to coating the inlet and outlet layers. The step of fixing can comprise chemically fixing the precious metal component on the respective refractory oxide and/or rare earth metal oxide. Alternatively, the step of fixing can comprise thermally treating the precious metal component on the respective refractory oxide and/or rare earth metal oxide. The step of fixing comprises calcining the precious metal component on the respective refractory oxide and/or rare earth metal oxide. The step of calcining can be conducted at from 200° C., preferably 250° C. to 900° C. at from 0.1 to 10 hours. The steps of thermally fixing each layer are preferably conducted after coating and prior to coating a subsequent layer. The step of thermally treating the substrate upon completion of coating all layers at from 200° C. to 400° C. at from 1 to 10 seconds. The steps of calcining is preferably the substrate conducted upon completion of coating all layers. The step of calcining is conducted at from 250° C. to 900° C. at from 0.1 to 10 hours.

The honeycomb has different zones along the length of the channels. The wall in the different zones can be uncoated or coated with different catalyst compositions or architectures. The term "architecture" is used to mean the physical design of the coating in a zone considering parameters such as the number of layers of coating compositions, the thickness of the layers, and the order of layers where there are more than one layer. The zones are defined by their coating (or lack of coating) and extend for a length of the channel in which there is the same coating and architecture. For example, a two layered catalyst coating defines a zone until it bounds with an adjacent zone having different compositions or different numbers of layers. Nonadjacent zones can have the same architecture and compositions. An advancement of the present invention is that soluble components in coating compositions are fixed in their respective zones. For example, precious metal which may be present is fixed in its respective zone and even layer within a zone. In this way, a single monolithic honeycomb can be multifunctional with a minimum and preferably no migration of precious metal components from zone to zone, particularly during the process of manufacture. The terms "fixed" and "segregated" shall mean that components within a zone, and within a layer within a zone remain within the zone with a minimum and preferably no migration or diffusion during the processing to manufacture the catalyzed substrate. An advancement of the monolith of the present invention is that there is a minimum of migration precious metal from one zone to another, even where a composition from one zone overlaps with the composition in another zone.

The inlet zone preferably comprises an inlet composition comprising at least one inlet refractory oxide composition or composite comprising a first refractory oxide selected from the group consisting of alumina, titania, zirconia, silica, an inlet rare earth metal oxide, a molecular sieve such as a zeolite and a first precious metal component, and the second or outlet zone comprises an outlet composition comprising at least one outlet refractory oxide composition or composite comprising an outlet refractory oxide selected from the group consisting of alumina, titania, zirconia, and silica, a rare earth metal oxide, a molecular sieve such as a zeolite and at least one second precious metal component. The first precious metal component can be fixed to the first refractory oxide composition and the first rare earth metal oxide. The second precious metal component can be fixed to one of the second refractory oxide composition and the second rare earth metal oxide. The first precious metal is in the first layer segregated from the second layer and the second precious metal is in the second layer segregated from the first layer. Where there is more than one layer, e.g. sublayers, in a zone, preferably the precious metal in a layer remains segregated within that layer.

Preferably, the precious metal can be prefixed on the supports. Alternatively the method further comprises fixing the soluble components in the layer such as one precious metal component selected from the first precious metal component of the inlet layer and the second precious metal component of the outlet layer to one of the respective first or second component selected from the first refractory oxide and first rare earth metal oxide components, and the second refractory oxide and second rare earth metal oxide components, the fixing being conducted prior to coating the inlet and outlet layers. The step of fixing can comprise chemically fixing the precious metal on the respective refractory oxide and/or rare earth metal oxide. More preferably, the step of fixing comprises thermally treating the precious metal on the respective refractory oxide and/or rare earth metal oxide. The step of thermally treating the substrate upon completion of coating one or more layers at from 200° C. to 400° C. at from 1 to 10, and preferably 2 to 6 seconds. The heat is provided by forcing a gas stream, preferably air which is heated to from 200° C. to 400° C. This temperature range has been found to substantially fix the soluble components such as precious metal components. The combination of flow rate and temperature of the gas stream should be sufficient to heat the coating layer and preferably, providing a minimum of heat to the underlying substrate to enable rapid cooling in the subsequent cooling step prior to application of subsequent layers. Preferably, the steps of thermally fixing each layer, preferably followed by cooling with ambient air, are conducted after coating and prior to coating a subsequent layer. The cooling step is preferably conducted using ambient air typically at from 5° C. to 40° C. at from 2 to 20, and preferably 4 to 10 seconds at a suitable flow rate. The combination of the ambient air flow rate and temperature of the gas stream should be sufficient to cool the coating layer. This method permits continuous coating of a plurality of layers on a substrate to form the above described article of the present invention.

A preferred method comprises the step of fixing the precious metal component selected from the first precious metal component of the first layer and the second precious metal component of the second layer to the respective first or second component selected from the first refractory oxide and first rare earth metal oxide components, and the second refractory oxide and second rare earth metal oxide components, the fixing being conducted prior to coating the first and second layers.

In yet another embodiment the method comprises the step of applying a vacuum to the partially immersed substrate at an intensity and a time sufficient to draw the coating media upwardly to a predesignated distance from the bath into each of the channels to form a uniform coating profile therein for each immersion step. Optionally, and preferably the substrate can be turned over to repeat the coating process from the opposite end with the second composition. The coated substrate should be thermally fixed after forming the inlet layer, and after turning the substrate over and forming the outlet layer.

The method can include a final calcining step. This can be conducted in an oven between coating layers or after the coating of all the layers on the substrate has been completed. The calcining can be conducted at from 250° C. to 900° C. at from 0.1 to 10 hours and preferably from 450° C. to 750° C. at from at from 0.5 to 2 hours. After the coating of all layers is complete the substrate can be calcined.

The following detailed description relates to a preferred embodiment in which the various components of the catalyst material according to the present invention are divided into two distinct coats. It will be understood, however, that the present invention includes embodiments in which the first layer composition and second layer composition may be incorporated into a single washcoat consisting of discrete particles of each composition.

The First, Bottom, or Upstream Layer

The first layer composition comprising a first support and a first platinum component provides a three-way conversion catalyst having the ability to simultaneously catalyze the oxidation of hydrocarbons and carbon monoxide and the reduction of nitrogen oxides. The first platinum metal component is very effective for hydrocarbon conversion. The first activated alumina support in the first layer may be present in an amount from about 0.15 g/in$^3$ to 2.0 g/in$^3$. It is desirable to have a high concentration (e.g. greater than 4% by wt) platinum supported on the alumina. It is found that high concentration of platinum on alumina support appears to exhibit higher hydrocarbon conversion in the first layer composition. The amount of platinum present in the first layer is at least 1 g/ft$^3$.

The first layer composition may optionally comprise a $NO_x$ sorbent component selected from the group consisting of alkaline earth metal components, alkali metal components, and rare earth metal components. Preferably, the $NO_X$ sorbent component is selected from the group consisting of oxides of calcium, strontium, and barium, oxides of potassium, sodium, lithium, and cesium, and oxides of cerium, lanthanum, praseodymium, and neodymium.

The first layer composition may optionally comprise a first platinum group metal component other than platinum which may be selected from the group consisting of palladium, rhodium, ruthenium, and iridium components. The preferred additional platinum group metal component in the first layer is selected from the group consisting of palladium, rhodium, and mixtures thereof.

The stabilizers and promoters are believed to stabilize and promote both the washcoat composition and platinum activity. The alkaline earth metal oxide and zirconia stabilizer are preferably from about 0.025 g/in$^3$ to 0.5 g/in$^3$ respectively. The rare earth metal oxide promoters are preferably from 0.025 g/in$^3$ to 0.50 g/in$^3$ respectively.

It is advantageous to incorporate a bulk fine particulate material of co-formed rare earth oxide-zirconia composite, e.g., ceria-zirconia and/or ceria-neodymia-zirconia composition as an additional catalytic promoter as described in U.S. Pat. No. 5,057,483. These particles do not react with the stabilized alumina washcoat and maintain a BET surface area of about 40 m$^2$/g upon exposure to 900° C. for a long period of time. Neodymia, if present in the composite is preferably from 0 to 10 wt % of the total weight of the composite. The rare earth oxide-zirconia particles, if present, are preferably from 0.1 g/in$^3$ to 2.0 g/in$^3$ of the finished catalyst composition. It is desirable to include a H$_2$S suppressor metal oxide in the first layer composition. For example, NiO in a particulate form may be present in an quantity from 0.025 g/in$^3$ to 0.5 g/in$^3$. The first layer may also contain other components useful as components of a washcoat, including a supplementary refractory metal oxide such as cordierite to enhance washcoat physical properties.

In the preparation of the first (bottom) layer, platinum supported on alumina is ball milled with additional components for a suitable time to obtain 90% of the particles having a particle size of less than about 20, preferably less than 10 and most preferably from 5 to 10 microns. In addition to the platinum supported alumina, other components of the first layer composition can be added to the ball mill including the $NO_x$ sorbent component, stabilizers, and promoters. There can be included the particulate composite of zirconia and rare earth oxide. The ball milled composition is then combined with a nickel oxide compound as well as recycled milled honeycomb. This first layer composition can be combined as a slurry with a suitable vehicle, preferably water, in an amount from 20 to 60% solid and preferably 25 to 55% solid.

The Second, Top, or Downstream Layer

The second layer composition comprises a second support and a $SO_X$ sorbent component having a free energy of formation from about 0 to about −90 Kcal/mole, preferably from about 0 to about −60 Kcal/mole, and more preferably from about −30 to about −55 Kcal/mole at 350° C. The second layer is a sulfur oxide absorbing layer before the nitrogen oxide absorbing first layer. The sulfur oxide absorbing layer selectively and reversibly absorbs sulfur oxides over nitrogen oxides and alleviates sulfur oxide poisoning of the nitrogen oxide trap.

Nonlimiting illustrative examples of SOx sorbent components may be selected from the group consisting of oxides and aluminum oxides of lithium, magnesium, calcium, manganese, iron, cobalt, nickel, copper, zinc, and silver. Preferably, the SOx sorbent component is selected from the group consisting of MgO, MgAl$_2$O$_4$, MnO, MnO$_2$, and Li$_2$O. More preferably, the SOx sorbent component is selected from the group consisting of MgO and Li$_2$O.

The second layer may optionally comprise a second platinum component to facilitate $NO_X$/$SO_x$ oxidization and $NO_X$/$SO_x$ decomposition and reduction and optionally at least one second platinum group metal component other than platinum which may be selected from the group consisting of palladium, rhodium, ruthenium, and iridium components. The preferred second platinum group metal component in the second layer is selected from the group consisting of palladium, rhodium, and mixtures thereof.

The second activated alumina support in the second layer may be present in an amount from about 0.15 g/in$^3$ to 2.0 g/in$^3$. It is preferred that the platinum supported on the alumina have a relatively high concentration (e.g., greater than 3 wt %). The amount of platinum in the second layer is at least 1 g/ft$^3$. The alkaline earth metal oxide, preferably strontium and zirconia components are preferably in an amount from about 0.025 g/in$^3$ to 0.50 g/in$^3$ respectively. The rare earth metal oxide promoters (neodymia and/or lanthana) are preferably in an amount from 0.025 g/in$^3$ to 0.50 g/in$^3$ respectively. Optionally, the bulk fine particulate material of co-formed rare earth oxide-zirconia composite as described in the first layer composition may be added to the second layer composition.

A second layer composition is formed by combining a SOx sorbent component capable of selectively absorbing $SO_x$ over $NO_x$ solution, dispersed on a refractory inorganic oxide support, preferably alumina. This combination with the second stabilizer which can include zirconia hydroxide and optionally a particulate composite comprising zirconia and rare earth oxides as described above, preferably zirconia in combination with ceria optionally containing neodymia and/or lanthana. This combination is combined with a suitable vehicle such as water to result in a composition comprising 45% solids which is ball milled to obtain particles of less than 25 microns, preferably less than 15 microns and typically from 5 to 10 microns. At this point stabilizing components such as strontium nitrate and promoting components including neodymium and/or lanthanum nitrate are added and the composition milled for up to 30 minutes. This results in a slurry having from 20 to 50% solids and a viscosity of from 50 to 80 centipores.

A carrier such as those described above, i.e., a cordierite monolith, is first dipped into the first washcoat with a target layering of from about 0.5 to 3.0 grams per cubic inch ("g/in$^3$") of carrier. The carrier is then dried in air at from about 100° C. to 120° C. until dry, and is then calcined in air at from about 400° C. to 600° C. for a period of from 0.25 to 2 hours. The carrier is then dipped into the second washcoat with a target coating weight (including bottom layer) of from about 1.0 to 5.0 g/in$^3$ of the carrier, is then dried in air at from about 100° C. to 120° C. and calcined in air at from about 400° C. to 600° C. for about 0.25 to 2 hours.

The catalytic compositions made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 100° C., typically about 150° C. to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides.

These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

A method aspect of the present invention provides a method for treating a gas containing noxious components comprising one or more of carbon monoxide, hydrocarbons and nitrogen oxides, by converting at least some of each of the noxious components initially present to innocuous substances such as water, carbon dioxide and nitrogen. The method comprises the step of contacting the gas under conversion conditions (e.g., a temperature of about 100° C. to 950° C. of the inlet gas to the catalyst composition) with a catalyst composition as described above.

The present invention is illustrated further by the following examples which are not intended to limit the scope of this invention.

EXAMPLE 1

These examples illustrates the preparation of a layered catalyst composite in accord with the present invention. A layered catalyst composite designated LEX-118 was prepared having the composition set out below.

L-118 First (Bottom) Layer:

In a planetary mixer, 44 parts of gamma-alumina was impregnated with 0.83 parts of Pt. Pt was introduced as conventional Pt aqueous solution with the dilution to reach incipient wetness of alumina. After drying the Pt-impregnated alumina (Pt—Al) at 120° C. for min. 2 hrs, 1.85 parts of Pd was added in the form of Pd aqueous solution with the dilution to reach incipient wetness of Pt-alumina. The Pd/Pt containing alumina powder was combined with 14 parts of Ba(OH)$_2$, sufficient DI-water, and 2% of acetic acid to make a slurry of 27% solid content before proceeding to milling. The milling was conducted until the particle size distribution showed 90% of particles become less than 10 um. All calculations were based on metal oxide basis except precious metals which were based on metal weight basis.

After milling, the following components were added to the slurry: 6 parts of Ba(OAc)2, 10 parts Mn(OAc) 2, 23.2 parts of composite of La/Ce=3/7 oxide, and 1.96 parts of ZrO(OAc) 2, and sufficiently shear mixed. Additional milling of 10 minutes was exercised to promote better mixing and to break down aggregates. The final slurry was coated onto ceramic honeycomb with 400 cell per square inch (CPSI) and with 6.5 mils wall thickness. The coating was performed by dipping the substrate into the slurry, draining the slurry, and followed by blowing off the excessive slurry with the compress air. The coated honeycomb was dried at 110° C. for 4 hrs and calcined at 550° C. for 2 hrs.

L-118 Second (Top) Layer:

0.31 parts of Rh was introduced into 19.2 parts of g-alumina, and 0.76 parts of Pt was added into 38.5 parts of λ-alumina, each in an aqueous solution form diluted just enough to fill all the pores. 30.2 parts of stabilized Ce—Zr compound (a 70% CeO2 containing Ce—Zr composite) and 5.5 parts of Ba(OH)$_2$ were added to the Pt-containing alumina and combined with sufficient DI-water and with 2% acetic acid, and milled to the particle size distribution showed 90% of particles become less than 9 um. 2.75 parts each of Ba(OAc)$_2$ and ZrO(OAc) 2 was added to Rh-containing alumina and milled as the same way as that of Pt-alumina. The milled slurries were shear mixed together and milled for additional 10 minutes. The final Pt/Rh-slurry was coated onto ceramic honeycomb on which Pt/Pd first layer mentioned above was already coated, and, was dried at 110° C. for 4 hrs and followed by calcination at 430° C. for 2 hrs.

EXAMPLE 2

(M-118)

M-118 First (Bottom) Layer:

In a planetary mixer, 43.1 parts of gamma-alumina was impregnated with 0.82 parts of Pt. Pt was introduced as conventional Pt aqueous solution with the dilution to reach incipient wetness of alumina. After drying the Pt-impregnated alumina (Pt—Al) at 120° C. for 2 hrs, 1.81 parts of Pd was added in the form of Pd aqueous solution with the dilution to reach incipient wetness of Pt-alumina. The Pd/Pt containing alumina powder was combined with DI-water and 2% of acetic acid to make a slurry of 30% solid content before proceeding to milling. The milling was conducted until the particle size distribution showed 90% of particles become less than 10 um.

The milled slurry have the following materials added: 5.9 parts of Ba(OAc) 2, 13.7 parts of Ba(OH) 2, 9.8 parts of Mn(OAc) 2, 22.7 parts of composite of La/Ce oxide=3/7, and 1.96 parts of ZrO(OAc) 2, and sufficiently shear mixed. Additional milling of 10 minutes was exercised to promote better mixing and to break down aggregates. The final slurry was coated onto ceramic honeycomb with 400 cell per square inch (CPSI) and with 6.5 mils wall thickness. The coating was performed by dipping the substrate into the slurry, draining the slurry, and followed by blowing off the excessive slurry by the compress air. The coated honeycomb was dried at 110° C. for 4 hrs and calcined at 550° C. for 2 hrs.

M-118 Second (Top) Layer:

1.4 parts of Rh was introduced into 79.1 parts of g-alumina and with 7.3 parts of stabilized Ce—Zr compound (a 10% CeO2 containing Ce—Zr composite) in an aqueous solution form diluted just enough to fill all the pores of both components. The Rh-containing powder was combined with sufficient DI-water and with 2% acetic acid, and milled to the particle size distribution showed 90% of particles become less than 10 um. 12.2 parts hydrotalcite $MgAl_2O_4$ was added to the milled slurry and shear mixed and milled for additional 10 minutes. The final Rh-slurry was coated onto ceramic honeycomb which has already coated with Pt/Pd first layer mentioned above, and, was dried at 110° C. for 4 hrs and followed by calcination at 430° C. for 2 hrs.

EXAMPLE 3

(M-531)

M-531 First (Undercoat) Layer:

In a planetary mixer, 31.4 parts of gamma-alumina was impregnated with 0.6 parts of Pt. Pt was introduced as conventional Pt aqueous solution with the dilution to reach incipient wetness of alumina. After drying the Pt-impregnated alumina (Pt—Al) at 120° C. for min. 2 hrs, 1.32 parts of Pd was added in the form of Pd aqueous solution with the dilution to reach incipient wetness of Pt-alumina. The Pd/Pt containing alumina powder was combined with 3.8 parts of Ba(OAc)2 and with sufficient DI-water, and 2% of acetic acid to make a slurry of approximately 39% solid content before proceeding to milling. The milling was conducted until the particle size distribution showed 90% of particles become less than 13 um.

After milling, 31.4 parts of a Ce/K=7/3 solid component, a 31.4 parts of Ce/Cs=7/3 solid component were added to the slurry. The slurry was sufficiently shear mixed and milled again until the particle size distribution showed 90% of particles become less than 8 um. The final slurry was coated onto ceramic honeycomb with 400 CPSI and with 4 mils wall thickness. The coating was performed by dipping the substrate into the slurry, draining the slurry, and followed by blowing off the excessive slurry with the compress air. The coated honeycomb was dried at 110° C. for 4 hrs and calcined at 550° C. for 2 hrs.

M-531 Second (Bottom) Layer:

All procedures and relative quantity of each component used followed the first layer of example-one L-118. The net washcoat gain is 80% of example-1.

M-531 Third (Middle) Layer:

In a planetary mixer, 35 parts of gamma-alumina was impregnated with 0.66 parts of Pt. After drying the Pt-impregnated alumina (Pt—Al) atl20° C. for min. 2 hrs, 1.48 parts of Pd was added in the form of Pd aqueous solution with the dilution to reach incipient wetness of Pt-alumina. The Pd/Pt containing alumina powder was combined with 2.6 parts of Ba(OAc)2, 7.7 parts of Ba(OH)2, and sufficient DI-water, and 2% of acetic acid to make a slurry of 37% solid content before proceeding to milling. The milling was conducted until the particle size distribution showed 90% of particles become less than 16 um. After milling, 10.2 parts of a Mg(OAc)2, and 2.6 parts of ZrO(OAc) 2 was added to the slurry. The slurry was sufficiently shear mixed and milled again until the particle size distribution showed 90% of particles become less than 14 um.

0.3 part of Rh was introduced into 16.6 parts of g-alumina to the incipient wetness. The Rh-containing alumina was combined with 23 parts of stabilized Ce—Zr composite (a 10% CeO2 containing Ce—Zr composite) and with above mentioned Pt/Pd-containing slurry, and milled to the particle size distribution showed 90% of particles become less than 10 um. The final Pt/Pd/Rh-containing slurry was coated onto ceramic honeycomb on which two previous layers were coated, and, was dried at 110° C. for 4 hrs and followed by calcination at 550° C. for 2 hrs.

M-531 Fourth (Top) Layer:

In a planetary mixer, 12 parts of $MgAl_2O_4$, obtained from calcining hydrotalcite at 750° C. for one hour, was impregnated with 0.2 parts of Pt to the incipient wetness. In another planetary mixer, 78.7 parts of gamma-alumina was impregnated with 1.4 parts of Rh to the incipient wetness. Both Rh- and Pt-containing powders were combined with sufficient DI-water and with 2% acetic acid, and milled to the particle size distribution showed 90% of particles become less than 12 um. Then, the milled slurry was introduced with 7.7 parts of stabilized Ce—Zr compound and shear mixed 10 minutes, and milled to the particle size distribution showed 90% of particles become less than 9 um. The final Pt/Rh-containing slurry was coated onto ceramic honeycomb which has already coated with three previous layers, and, was dried at 110° C. for 4 hrs and followed by calcination at 430° C. for 2 hrs.

EXAMPLE 4

(M-118H1)

Catalyst from example-2 was dipped with KOH in axial direction for 25% of the axial length. The K2O to washcoat ratio is around 5% per unit volume of catalyst.

Testing Procedure

Catalysts of 1.5×3" (diameter×length) in size were aged and tested under the following fresh and aged conditions:

Fresh catalysts were evaluated under four temperatures corresponding to four volumetric flow rates (VHSVs, Volumetric Hourly Space Velocity, defined as "volumetric gas flow rate in one hour" devided by "volume of solid catlayst", namely, 250° C. @26 K/hr, 350° C. @65 K/hr, 425° C. @78 K/hr, and 500° C. @100 hrs. At each temperature, each catalyst was pre-treated with indolene fuel at A/F=12 for 2 minutes before NOx storage testing began. There were 8 cycles, each composed of 60 seconds lean (@A/F=18.5) and two seconds rich (@A/F=12). NOx input minus NOx output at each second was recorded. Net cumulative amount of NOx absorbed and treated in the 62 seconds cycle was averaged throughout 8 cycles and reported.

After fresh evaluation, catalysts were aged 680° C. 12 hrs, evaluated, aged in 780° C. 12 hrs, and evaluated again. Phase-II California fuel was used to perform engine aging in which fuel-cut was generated around 2~3 seconds in every minute. The evaluation included 3 temperatures corresponding to three volumetric flow rates. They were: 250° C. @26 K/hr, 350° C. @26 K/hr, and 480° C. @80 K/hr. The conditions were selected to facilitate the differentiation of various types of catalysts.

NOx Absorbed & Treated in Each Cycle After
680° C. & 780° C. Fuel Cut Engine Aging each 12 hrs

| NOx ppm | L-118 | M-531 | M-118 | M-118H1 |
|---|---|---|---|---|
| 250° C., 26K/hr | 124.3 | 215.7 | 131.6 | 177 |
| 350° C., 26K/hr | 194.8 | 483.4 | 335.1 | 635.6 |
| 480° C., 80K/hr | 192.1 | 489.8 | 359.4 | 583.3 |

PM Loading of Experimental NOx-Trap Catalysts

| | PM Loading | | *** PM Ratios *** | | |
|---|---|---|---|---|---|
| Technology | g/ft3 | g/L | Pt | Pd | Rh |
| L-118 | 150 | 5.3 | 6 | 8 | 1 |
| M-118 | 180 | 6.36 | 5 | 11 | 2 |
| M-531 | 212 | 7.5 | 15 | 32 | 6 |

NOx Absorbed & Treated in Each Cycle As Fresh Catalyst

| NOx Storage | L-118 | M-118 | M-531 | M-118H1 |
|---|---|---|---|---|
| 250° C., 26K/hr | 373.9 | 284.7 | 399.7 | 324.9 |
| 350° C., 65K/hr | 674.8 | 678 | 854.5 | 780.5 |
| 425° C., 78K/hr | 494.7 | 623.7 | 802.5 | 939.6 |
| 500° C., 100K/hr | 588.8 | 865.8 | 1209.6 | 1256.9 |

NOx Absorbed & Treated in Each Cycle After
680° C. & 780° C. Fuel Cut Engine Aging each 12 hrs

| NOx ppm | L-118 | M-531 | M-118 | M-118H1 |
|---|---|---|---|---|
| 250° C., 26K/hr | 124.3 | 215.7 | 131.6 | 177 |
| 350° C., 26K/hr | 194.8 | 483.4 | 335.1 | 635.6 |
| 480° C., 80K/hr | 192.1 | 489.8 | 359.4 | 583.3 |

FIG. 1 shows the free energy of formation of nitrates, sulfates, and nitrites in Kcal/mole at 350° C.

FIG. 2 shows the free energy of formation in Kcal/mole at 350° C., 650° C., 750° C., and 850° C. for sulfates.

Accordingly, these examples illustrate that the layered catalyst composites of the present invention are better than, with respect to the amount of $NO_x$ absorbed, the amount of hydrocarbon conversion, the amount of hydrocarbon conversion after aging, and the amount of improvement in lean NOx, the non-inventive catalyst composites.

While the invention has been described in detail with respect to specific embodiments thereof, such embodiments are illustrative and the scope of the invention is defined in the appended claims.

I claim:

1. A method for removing NOx and SOx contaminants from a gaseous stream comprising the steps of:
   (A) in a sorbing period, passing a lean gaseous stream within a sorbing temperature range through a layered catalyst composite comprising a first layer and a second layer:
      (a) the first layer comprising a first support, a NOx sorbent component, and a first platinum component; and
      (b) the second layer comprising a second support and a SOx sorbent component selected from the group consisting of $MgAl_2O_4$, MgO, MnO, $MnO_2$, and $Li_2O$, wherein the SOx sorbent component has a higher free energy of formation at 350° C. than the NOx sorbent component;
   to sorb at least some of the SOx contaminants into the second layer and thereby provide a SOx depleted gaseous stream exiting the second layer and entering the first layer, wherein the first layer sorbs and abates the NOx in the gaseous stream; and
   (B) in a desorbing period, converting the lean oxidative stream to a rich reductive gaseous stream and raising the temperature of the gaseous stream to within a desorbing temperature range to thereby reduce and desorb at least some of the SOx contaminants from the second layer and thereby provide a SOx enriched gaseous stream exiting the second layer.

2. The method as recited in claim 1, wherein the first and second supports are the same or different and are compounds selected from the group consisting of silica, alumina, and titania compounds.

3. The method as recited in claim 1, wherein the SOx sorbent component is MgO or $Li_2O$.

4. The method as recited in claim 1, wherein the second layer comprises from about 0.03 g/in3 to about 2.4 g/in3 of the SOx sorbent component.

5. The method as recited in claim 4, wherein the second layer comprises from about 0.3 g/in3 to about 1.8g/in3 of the SOx sorbent component.

6. The method as recited in claim 1, wherein the NOx sorbent component is selected from the group consisting of alkaline earth metal components, alkali metal components, and rare earth metal components.

7. The method as recited in claim 6, wherein the NOx sorbent component is selected from the group consisting of oxides of calcium, strontium, and barium, oxides of potassium, sodium, lithium, and cesium, and oxides of cerium, lanthanum, praseodymium, and neodymium.

8. The method as recited in claim 7, wherein the NOx sorbent component is selected from the group consisting of oxides of calcium, strontium, and barium.

9. The method as recited in claim 7, wherein the NOx sorbent component is selected from the group consisting of oxides of potassium, sodium, lithium, and cesium.

10. The method as recited in claim 7, wherein the NOx sorbent component is selected from the group consisting of oxides of cerium, lanthanum, praseodymium, and neodymium.

11. The method as recited in claim 7, wherein the NOx sorbent component is at least one alkaline earth metal component and at least one rare earth metal component selected from the group consisting of lanthanum and neodymium.

12. The method as recited in claim 1, wherein at least one of the first or second layers further comprises a zirconium component.

13. A method for removing NOx and SOx contaminants from a gaseous stream comprising the steps of:
    (A) in a sorbing period, passing a lean gaseous stream within a sorbing temperature range through an axial layered catalyst composite comprising an upstream section and a downstream section:
        (1) the downstream section comprising:
        (a) a downstream substrate; and
        (b) a first layer on the downstream substrate, the first layer comprising a first support, a NOx sorbent component, and a first platinum component;
        (2) the upstream section comprising:
        (a) an upstream substrate; and
        (b) a second layer on the upstream substrate, the second layer comprising a second support and a SOx sorbent component selected from the group consisting of $MgAl_2O_4$, MgO, MnO, $MnO_2$, and $Li_2O$, wherein the SOx sorbent component has a higher free energy of formation at 350° C. than the NOx sorbent component;
    to sorb at least some of the SOx contaminants into the upstream section and thereby provide a SOx depleted gaseous stream exiting the upstream section and entering the downstream section, wherein the downstream section sorbs and abates the NOx in the gaseous stream; and
    (B) in a desorbing period, converting the lean oxidative gaseous stream to a rich reductive gaseous stream and raising the temperature of the gaseous stream to within a desorbing temperature range to thereby reduce and desorb at least some of the SOx contaminants from the upstream section and thereby provide a SOx enriched gaseous stream exiting the upstream section.

14. The method as recited in claim 13, wherein
    (1) the first layer on the downstream substrate comprises a NOx sorbent component selected from the group consisting of cesium components, potassium components, and cerium components; and
    (2) the second layer on the upstream substrate comprises a SOx sorbent component which is $MgAl_2O_4$; and further comprising a first midstream section located between the upstream section and the downstream section:
        (3) the first midstream section comprising:
        (a) a first midstream substrate; and
        (b) a third layer on the first midstream substrate, the third layer comprising:
            (i) a third support; and
            (ii) a third SOx sorbent component which is selected from the group consisting of BaO and MgO;
    to sorb at least some of the SOx contaminants into the first midstream section and thereby provide a SOx depleted gaseous stream exiting the first midstream section and entering the downstream section, wherein the downstream section sorbs and abates the NOx in the gaseous stream; and
    (B) in a desorbing period, converting the lean gaseous stream to a rich gaseous stream and raising the temperature of the gaseous stream to within a desorbing temperature range to thereby reduce and desorb at least some of the SOx contaminants from the first midstream section and thereby provide a SOx enriched gaseous stream exiting the first midstream section.

15. A method for removing NOx and SOx contaminants from a gaseous stream comprising the steps of:
    (A) in a sorbing period, passing a lean gaseous stream within a sorbing temperature range through a radial layered catalyst composite comprising a bottom layer, a first middle layer, and a top layer:
        (a) the bottom layer comprising: (i) a first support;
            (ii) a first platinum component;
            (iii) a first NOx sorbent component selected from the group consisting of cesium components, potassium components, and cerium components; and
        (b) the first middle layer comprising:
            (i) a second support;
            (ii) a second SOx sorbent component which is selected from the group consisting of BaO and MgO; and
        (c) the top layer comprising:
            (i) a third support;
            (ii) a third SOx sorbent component which is $MgAl_2O_4$;
    to sorb at least some of the SOx contaminants into the top and first middle layers and thereby provide a SOx depleted gaseous stream exiting the top and first middle layers and entering the bottom layer, wherein the bottom layer sorbs and abates the NOx in the gaseous stream; and
    (B) in a desorbing period, converting the lean gaseous stream to a rich gaseous stream and raising the temperature of the gaseous stream to within a desorbing temperature range to thereby reduce and desorb at least some of the SOx contaminants from the top and first middle layers and thereby provide a SOx enriched gaseous stream exiting the top and first middle layers.

16. The method as recited in claim 15, wherein
    (3) the first middle layer comprises a SOx sorbent component which is MgO; and further comprising a second middle layer located between the bottom layer and the first middle layer:
    (d) the second middle layer comprising:
        (i) a fourth support; and
        (ii) a SOx sorbent component which is BaO; to sorb at least some of the SOx contaminants into the second middle layer and thereby provide a SOx depleted gaseous stream exiting the second middle layer and entering the bottom layer, wherein the bottom layer sorbs and abates the NOx in the gaseous stream; and (B) in a desorbing period, converting the lean gaseous stream to a rich gaseous stream and raising the temperature of the gaseous stream to within a desorbing temperature range to thereby reduce and desorb at least some of the SOx contaminants from the second middle layer and thereby provide a SOx enriched gaseous stream exiting the second layer.

* * * * *